(12) United States Patent
Ionescu et al.

(10) Patent No.: US 11,591,478 B2
(45) Date of Patent: Feb. 28, 2023

(54) SILICON MATERIAL AND METHOD OF MANUFACTURE

(71) Applicant: ionobell, Inc., San Jose, CA (US)

(72) Inventors: Robert C. Ionescu, San Jose, CA (US); Chueh Liu, San Jose, CA (US)

(73) Assignee: ionobell, Inc., San Jose, CA (US)

( * ) Notice: Subject to any disclaimer, the term of this patent is extended or adjusted under 35 U.S.C. 154(b) by 0 days.

(21) Appl. No.: 17/824,627

(22) Filed: May 25, 2022

(65) Prior Publication Data

US 2022/0380223 A1 Dec. 1, 2022

Related U.S. Application Data

(60) Provisional application No. 63/192,688, filed on May 25, 2021, provisional application No. 63/273,032, filed on Oct. 28, 2021.

(51) Int. Cl.

| | |
|---|---|
| *C09C 3/00* | (2006.01) |
| *B02C 21/00* | (2006.01) |
| *B02C 23/24* | (2006.01) |
| *B02C 17/20* | (2006.01) |
| *C01B 33/02* | (2006.01) |
| *C09C 1/28* | (2006.01) |
| *C09C 3/04* | (2006.01) |
| *C09C 3/06* | (2006.01) |
| *B02C 17/18* | (2006.01) |
| *C01B 33/18* | (2006.01) |
| *C08K 3/04* | (2006.01) |
| *C09D 133/20* | (2006.01) |
| *B02C 17/16* | (2006.01) |

(52) U.S. Cl.
CPC .......... *C09C 3/006* (2013.01); *B02C 17/1815* (2013.01); *B02C 17/20* (2013.01); *B02C 21/00* (2013.01); *B02C 23/24* (2013.01); *C01B 33/02* (2013.01); *C01B 33/182* (2013.01); *C08K 3/04* (2013.01); *C09C 1/28* (2013.01); *C09C 3/041* (2013.01); *C09C 3/063* (2013.01); *C09D 133/20* (2013.01); *B02C 17/16* (2013.01); *C01P 2004/30* (2013.01); *C01P 2004/61* (2013.01); *C01P 2004/62* (2013.01); *C01P 2004/80* (2013.01); *C01P 2006/12* (2013.01); *C01P 2006/80* (2013.01); *C08K 2201/005* (2013.01)

(58) Field of Classification Search
CPC .......... C01B 33/182; C08K 3/04; C08K 3/36; C08K 2201/005; C08K 2003/023; C09D 133/20; C01P 2004/61; C01P 2006/12
See application file for complete search history.

(56) References Cited

U.S. PATENT DOCUMENTS

| | | |
|---|---|---|
| 6,060,680 A | 5/2000 | Turner et al. |
| 7,087,346 B2 | 8/2006 | Barker et al. |
| 7,097,939 B2 | 8/2006 | Ferreira et al. |
| 8,012,676 B2 | 9/2011 | Yoshiki et al. |
| 9,666,855 B2 | 5/2017 | Voillequin et al. |
| 9,765,271 B2 | 9/2017 | Myrick |
| 10,263,249 B2 | 4/2019 | Kim et al. |
| 10,756,330 B2 | 8/2020 | Wang et al. |
| 10,763,501 B2 | 9/2020 | Feaver et al. |
| 10,777,807 B2 | 9/2020 | Haufe |
| 11,133,493 B2 | 9/2021 | Sonntag et al. |
| 2008/0299455 A1 | 12/2008 | Shiozaki et al. |
| 2011/0052475 A1 | 3/2011 | Barati et al. |
| 2012/0244436 A1 | 9/2012 | Kerlau |
| 2012/0315538 A1 | 12/2012 | Chiang et al. |
| 2015/0099187 A1 | 4/2015 | Cui et al. |
| 2015/0155538 A1 | 6/2015 | Tang et al. |
| 2016/0308205 A1 | 10/2016 | Canham et al. |
| 2017/0194631 A1 | 7/2017 | Favors et al. |
| 2018/0013137 A1 | 1/2018 | Put et al. |
| 2018/0083272 A1 | 3/2018 | Son et al. |
| 2018/0097229 A1 | 4/2018 | Jo et al. |
| 2018/0342757 A1 | 11/2018 | Choi et al. |
| 2019/0097222 A1 | 3/2019 | Feaver et al. |
| 2019/0326593 A1 | 10/2019 | Ozkan et al. |
| 2020/0194749 A1 | 6/2020 | Ogata et al. |
| 2020/0313175 A1 | 10/2020 | Shin et al. |
| 2020/0313193 A1 | 10/2020 | Shin et al. |
| 2020/0358100 A1 | 11/2020 | Duong et al. |
| 2020/0388846 A1 | 12/2020 | Kim et al. |
| 2021/0057736 A1 | 2/2021 | Feaver et al. |
| 2021/0075055 A1 | 3/2021 | Duong et al. |
| 2021/0114886 A1* | 4/2021 | Rohani ................ H01M 4/625 |
| 2021/0143439 A1 | 5/2021 | Kim et al. |
| 2021/0234173 A1 | 7/2021 | Wang et al. |

(Continued)

FOREIGN PATENT DOCUMENTS

TW 201926779 A 7/2019

OTHER PUBLICATIONS

Evonik, Aerosil-Fumed Silica—Technical Overview, 104 pages, downloaded Feb. 17, 2021.
Wikipedia definition for Porous Silicon, 8 pages.
Andersen, Hanne Flaten, et al., "Silicon-Carbon composite anodes from industrial battery grade silicon", Scientific Reports (2019) 9:14814.

(Continued)

*Primary Examiner* — Edward J Cain
(74) *Attorney, Agent, or Firm* — Jeffrey Schox; Randy Mehlenbacher

(57) ABSTRACT

A silicon material can include a silicon aggregate comprising a plurality of porous silicon nanoparticles welded together. The silicon aggregate can optionally have a polyhedral morphology. A method can include: receiving a plurality of porous silicon nanoparticles and cold welding the plurality of porous silicon nanoparticles into an aggregated silicon particle.

22 Claims, 10 Drawing Sheets

(56) References Cited

U.S. PATENT DOCUMENTS

2021/0320320 A1 10/2021 Yushin et al.
2021/0344003 A1 11/2021 Yushin et al.

OTHER PUBLICATIONS

Bai, Yangzhi, et al., "A high-performance silicon/carbon composite as anode materials for lithium ion batteries", Nano Express 2(2021) 01021.
Ball, Philip, "Silicon seduced from silica: Synthetic silicon could be cheaper and more delicate", Nature, May 19, 2003, 2 pages.
Bux, Sabah, et al., "Nanostructured Bulk Silicon as an Effective Thermoelectric Material", Adv. Func. Mater. 2009, 19, 2445-2452.
Campbell, Brennan, et al., "Carbon-Coated, Diatomite-Derived Nanosilicon as a High Rate Capable Li-ion Battery Anode", Scientifc Reports, 6: 33050, 9 pages.
Choi, Insoo, et al., "Fading mechanisms of carbon-coated and disproportionated Is/SIOx negative electrode (SI/SiOx/C) in Li-ion secondary batteries: Dynamics and component analysis by TEM", Electrochimica Acta 85 (2012) 369-376.
Dai, Fang, et al., "Minimized Volume Expansion in Hierarchical Porous Silicon upon Lithiation", ACS Appl. Mater. Interfaces 2019, 11, pgs. 13257-13263.
Darghouth, A., et al., "High Purity Porous Silicon Powder Synthesis by Magnesiothermic Reuction of Tunisina Silica Sand", Silicon, Research Gate, Apr. 2020, 11 pages.
Favors, Zachary, "Scalable Synthesis of Nano-Silicon from Beach San for Long Cycle Life Li-ion Batteries", Scientific Reports, 4: 5623, 7 pages, published Jul. 8, 2014.
Favors, Zachary, et al., "Towards Scalable Binderless Electrodes: Carbon Coated Silicon Nanofiber Paper via Mg Reduction of Electrospun SiO2 Nanofibers", Scientific Reports, 5: 8246, 7 pages, published Feb. 6, 2015.
Gauthier, Magali, et al., "A low-cost and high performance ball-milled S-based negative electrode for high energy Li-ion batteries", Energy Environ. Sci., 2013, 6, 2145-2155.
Gauthier, Magali, et al., "From Si-wafers to cheap and efficient Is electrodes for Li-ion batteries", Journal of Power Sources 256 (2014) 32-36.
Haregerwoin, Atetegeb Meazah, et al., "Electrolyte additives for lithium ion battery electrodes: progress and perspectives", The Royal Society of Chemistry 2016, Energy Environ. Sci. 2016, 9, 1955-1988.
Hyung, Yoo E., et al., "Flame-retardant additives for lithium-ion batteries", Journal of Power Sources 119-121 (2003) 383-387.
Jang, Hee Dong, et al., "Aerosol-Assisted Extraction of Silicon Nanoparticles from Wafer Slicing Waste for Lithium Ion Batteries", Scientific Reports, 5 : 9431, Mar. 30, 2015.
Jia, Haiping, et al., "A novel approach to synthesize micrometer-sized porous silicon as a high performance anode for lithium-ion batteries", Nano Energy 50 (2018) pp. 589-597.
Kang, M., et al., "Intrinsically conductive polymer binders for electrochemical capacitor application", The Royal Society of Chemistry 2014, 4, 27939-27945.
Kim, Sang Woo, et al., "Current Collectors for Flexible Lithium Ion Batteries: A Review of Materials", J. Electrochemical. Sci. Techno. 6(1), 1-6 (2015).

Li, Changling, et al., "Silicon Derived from Glass Bottles as Anode Materials for Lithium Ion Full Cell Batteries", Scientific Reports, 7:917, 11 pages, published Apr. 19, 2017.
Lu, Yang, et al., "Cold welding of ultra thin gold nanowires", Nature Nanotechnology, vol. 5, Mar. 2010.
Nguyen, Van At, et al., "Review-Conducting Polymer-Based Binders for Lithium-Ion Batteries and Beyond", Journal of the Electrochemical Society, 2020 167 065501.
Shen, Xiaohui, et al., "Research progress on silicon/carbon composite anode materials for lithium-ion battery", Journal of Energy Chemistry 27 (2018) 1067-1090.
Tong, Ling, et al., "Interface Engineering of Silicon/Carbon Thin-Film Anodes for High-Rate Lithium-Ion Batteries", ACS Apps. Mater. Interfaces 2020,12, 29242-29252.
Tseng, Yu-Hsien, et al., "On-site coagulation gel polymer electrolytes with a high dielectric constant for lithium-ion batteries", Journal of Power Sources 480 (2020) 228802.
Wang, Dingsheng, et al., "High performance amorphous-Si@SiOx/C composite anode materials for Li-ion batteries derived from ball-milling and in situ carbonization", Journal of Power Sources 256 (2014) 190-199.
Wang, Wei, et al., "Monodisperse Porou Silicon Spheres as Anode Materials for Lithium Ion Batteries", Scientific Reports, 5: 8781 6 pages, published Mar. 5, 2015.
Wang, Fei, et al., "One-pot solution synthesis of carbon-coated silicon nanoparticles as an anode material for lithium-ion batteries", Chem. Commun., 2020, 56, 1109-1112.
Yan, Zheng, "Silicon Li-ion Anode Materials via Spray Drying and Magnesiothermic Reduction", published on Jun. 2019, Chemical and Environmental Engineering, pp. 1-106).
Zhang, Tianwen, "Porous silicon nano-aggregate from silica fume as an anode for high energy lithium-ion batteries", RSC Adv. 2016, 6, 30577-30581.
Barbehenn, George H., et al., "Battery Conditioner Extends the Life of Li-Ion Batteries", Linear Technology Magazine, Dec. 2009, pp. 29-30.
Gauthier, Magali, "A low-cost and high performance ball-milled Si-based negative electrode for high-energy Li-ion batteries", Energy Environ. Sci.. 6.-. 10.1039/C3EE41318G. Abstract; p. 2146 para 2; p. 2147 para 2.
Li, Qiuyan, et al., "Failure Analysis and Design Principles of Silicon-Based Lithium-Ion Batteries Using Micron-Sized Porous Silicon/Carbon Composite", SSRN, posted Jun. 30, 2022, https://papers.ssm.com/sol3/papers.cfm?abstract_id=4150565.
McBrayer, Josefine D., et al., "Calendar aging of silicon-containing batteries", Nature Energy,vol. 6, Sep. 2021, 866-872, www.nature.com/natureenergy.
Nzabahimana, Joseph, "Porous carbon-coated ball-milled silicon as high-performance anodes for lithium-ion batteries", J Master Sci (2019) 54: 4798-481; http://doi.org/10.1007/s10853-018-3164-9 p. 4801 para 2, Scheme 1; p. 4802 para 2; Figure 1(d).
Scheffler, Sören, et al., "Calendering of Silicon-Containing Electrodes and Their Influence on the Mechanical and Electrochemical Properties", Batteries 2022, 8, 46. https://doi.org/10.3390/batteries8050046, published May 18, 2022.
Tan, Darren H.S., et al., "Carbon-free high-loading silicon anodes enabled by sulfide solid electrolytes", Science 373, 1494-1499 (2021) Sep. 24, 2021.

* cited by examiner

Surface melting  10
100

Ball milling  10
100

Ball milling  10
100

Ball milling  10
100

Continuous ball milling

Intermittent ball milling

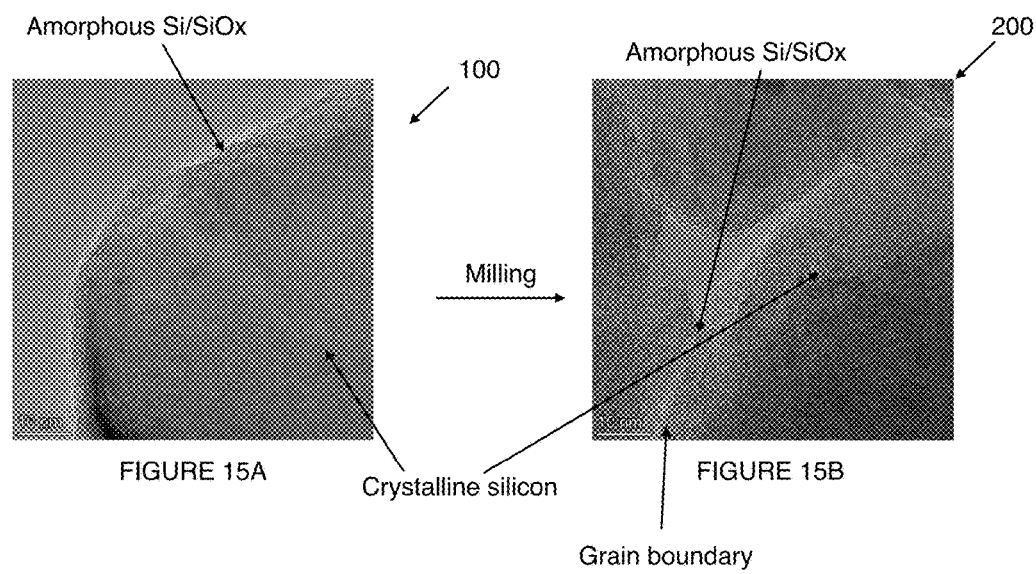
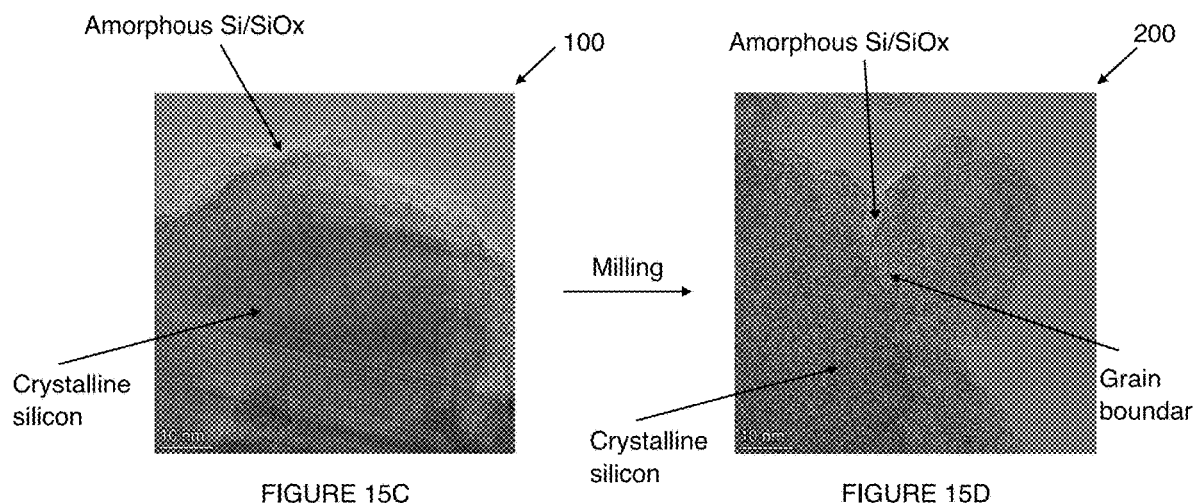

SILICON MATERIAL AND METHOD OF MANUFACTURE

CROSS-REFERENCE TO RELATED APPLICATIONS

This application claims the benefit of U.S. Provisional Application No. 63/192,688 filed 25 May 2021 and U.S. Provisional Application No. 63/273,032 filed 28 Oct. 2021, each of which is incorporated in its entirety by this reference.

TECHNICAL FIELD

This invention relates generally to the silicon field, and more specifically to a new and useful system and method in the silicon field.

BRIEF DESCRIPTION OF THE FIGURES

FIGS. 15A and 15C are high-resolution transmission electron microscope images of exemplary silicon particles before milling.

FIGS. 15B and 15D are high-resolution transmission electron microscope images of exemplary silicon particles analogous to those in FIG. 15A and FIG. 15C respectively, after milling.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 2:
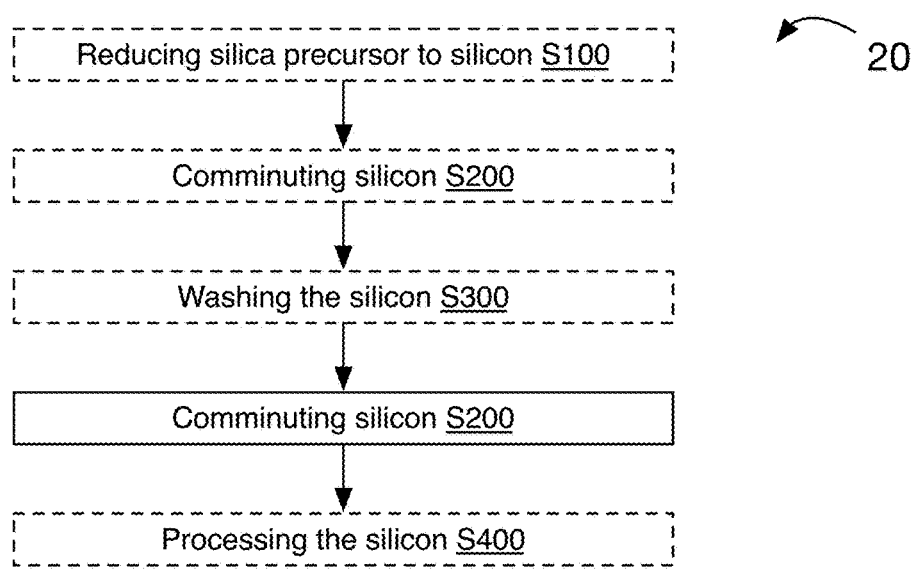
FIG. 2 is a schematic representation of an exemplary silicon material manufacture process.

As shown in FIG. 2, a method 20 for manufacturing a silicon material can include comminuting silicon S200. The method can optionally include reducing a silica precursor to silicon S100, washing the silicon S300, processing the silicon S400, and/or any suitable steps. The resulting silicon material can include a plurality of particles, but can have any morphology and/or materials.

The silicon material 10 is preferably used as an anode material (e.g., an anode slurry) in a battery (e.g., a Li-ion battery, a battery as disclosed in U.S. patent application Ser. No. 17/672,532 titled 'SILICON ANODE BATTERY' filed 15 Feb. 2022, which is incorporated in its entirety by this reference, etc.). However, the silicon material can additionally or alternatively be used for photovoltaic applications (e.g., as a light absorber, as a charge separator, as a free carrier extractor, etc.), as a thermal insulator (e.g., a thermal insulator that is operable under extreme conditions such as high temperatures, high pressures, ionizing environments, low temperatures, low pressures, etc.), for high sensitivity sensors (e.g., high gain, low noise, etc.), as a radar absorbing material, as insulation (e.g., in buildings, windows, thermal loss and solar systems, etc.), for biomedical applications, for pharmaceutical applications (e.g., drug delivery), as an aerogel or aerogel substitute (e.g., silicon aerogels), and/or for any suitable application. For some of these applications, including but not limited to the pharmaceutical applications, the silicon material can be oxidized into silica (e.g., $SiO_2$ that retains a morphology substantially identical to that of the silicon material) and/or used as silicon. The silicon can be oxidized, for example, by heating the silicon material (e.g., in an open environment, in an environment with a controlled oxygen content, etc.) to between 200 and 1000° C. for 1-24 hours. However, the silicon could be oxidized using an oxidizing agent and/or otherwise be oxidized.

2. Benefits

Variations of the technology can confer several benefits and/or advantages.

First, variants of the silicon material can enable silicon anodes (or other applications) with small external expansion (e.g., <200%, <100%, <50%, <40%, <30%, <20%, <10%, <5%, <2%, <1%, etc. volumetric or linear expansion) and high cyclability (e.g., ability to charge and discharge at least 100, 200, 300, 500, 1000, 2000, 5000, 10000, >10000 times). In specific examples, a high internal surface area and/or porosity and a low external surface area and/or porosity can enable the small external expansion and high cyclability.

Second, variants of the technology can enable "green chemistry" approaches to the generation of the silicon materials. In specific examples, the process for manufacturing the silicon material can reuse waste materials (e.g., used silica, used salts, used reducing agents, etc.) thereby reducing the amount of waste used and/or generated.

Third, variants of the technology can use waste material from other processes, thereby decreasing overall material and manufacturing cost.

Fourth, variants of the technology can enable continuous (e.g., for 30 minutes, 1 hour, 2 hours, 4 hours, 6 hours, 12 hours, 24 hours, 48 hours, etc.) milling of material (e.g., without breaks, without stopping, without changing speeds, etc.). In a specific example, by using a cooled (e.g., water cooled, cryogenically cooled, etc.) milling jar, silicon material can be milled continuously for greater than 1 hour.

Fifth, the inventors have discovered that continuous comminution processes (e.g., duty cycles of approximately 100%, without stopping milling, without stopping a motion of the ball mill, without substantially changing a milling speed, without changing a milling parameter, etc.) can decrease (e.g., avoid, minimize, etc.) an amount of spherification (e.g., formation of spherical, ellipsoidal, spheroidal, ovoid, etc. particles) that can occur with intermittent (e.g., at a duty cycle less than 100%, with periods of active milling and periods without milling, etc.). The inventors have discovered that spherification (and/or silicon materials possessing a significant amount of particles that have undergone spherification) can be undesirable in some applications (e.g., for battery anodes such as to decrease a number of cycles, a capacity, an energy density, lifetime, etc.), and therefore a process the decreases (e.g., minimizes, prevents, avoids, does not exhibit, exhibits less than a threshold amount of such as less than 0.1%, 1%, 5%, 10%, 20%, etc. of particles having undergone, etc.) spherification can be beneficial. Additionally or alternatively, some applications may be enhanced or improved by spherification of silicon material (e.g., particles thereof) and therefore processes that favor (e.g., enhance, increase the occurrence of, etc.) spherification (e.g., intermittent milling such as with a 1-50% duty cycle where active milling is occurring) may be performed.

Sixth, variants of the technology can enhance a stability of a silicon material (e.g., mechanical stability, electrical stability, chemical stability, etc.). For instance, oxygen (or other oxidizing agents) can be introduced during a milling or comminution process to increase an oxygen content of the silicon material (e.g., such that the silicon material possess between about 0.1-10% oxygen by mass or values or ranges bounded therein).

However, variants of the technology can confer any other suitable benefits and/or advantages.

As used herein, "substantially" or other words of approximation (e.g., "about," "approximately," etc.) can be within a predetermined error threshold or tolerance of a metric, component, or other reference (e.g., within 0.001%, 0.01%, 0.1%, 1%, 5%, 10%, 20%, 30%, etc. of a reference), or be otherwise interpreted.

3. Silicon Material

The silicon material preferably includes a plurality of particles 100. The particles 100 can be nanoparticles, mesoparticles, microparticles, macroparticles, and/or any suitable particles. The particles are preferably made of silicon, but can additionally or alternatively include silica (e.g., silicon oxide such as $SiO_x$, $SiO_2$, etc.), and/or any suitable additives or other materials or elements. The silicon content of the silicon material is preferably at least 50% (e.g., 50%, 55%, 60%, 65%, 70%, 75%, 80%, 85%, 90%, 91%, 92%, 93%, 94%, 95%, 96%, 97%, 98%, 99%, 99.5%, 99.9%, 99.99%, values therebetween, >99.99% such as by weight, by volume, by stoichiometric ratio, etc.), but can be less than 50% (e.g., can include regions with less than 50% silicon such as carbon rich regions). The remainder of the silicon content can include oxygen, nitrogen, hydrogen, carbon, magnesium, aluminium, lithium, sodium, halogens, and/or any suitable elements. For example, the elemental composition of the silicon material can include SiOC, SiC, $Si_xO_xC$, $Si_xO_xC_x$, $Si_xC_x$, $SiO_x$, $Si_xO_x$, $SiO_2C$, $SiO_2C_x$, $SiOC_y$, $SiC_y$, $Si_xO_xC_y$, $Si_xO_xC_xY_x$, $Si_xC_xY_x$, $SiO_xY_x$, $Si_xO_xY_x$, $SiO_2CY$, $SiO2C_xY_x$, and/or have any suitable composition (e.g., include additional element(s)), where Y can refer to any suitable element of the periodic table (e.g., halgoens, chalcogens, pnictogens, group 13 elements, transition metals, alkaline earth metals, alkali metals, etc.) and x is preferably between 0.001 and 0.05 (but can be less than 0.001 or greater than 0.05). The material composition of the silicon material can be isotropic (e.g., homogeneous distribution of silicon and other additives, dopants, impurities, etc.) and/or anisotropic (e.g., inhomogeneously distributed silicon and other materials such as forming a core-shell like structure). In an illustrative example of an anisotropic material distribution, a surface of the silicon material (e.g., a surface exposed to atmosphere or an environment proximal the silicon material) can have a higher oxygen or silica concentration than an interior of the silicon material (e.g., a volume that is not proximal or exposed to the atmosphere or environment). However, an engineered material gradient and/or any suitable material distribution can exist within the silicon material.

Figures 1A, 1B, 1C:
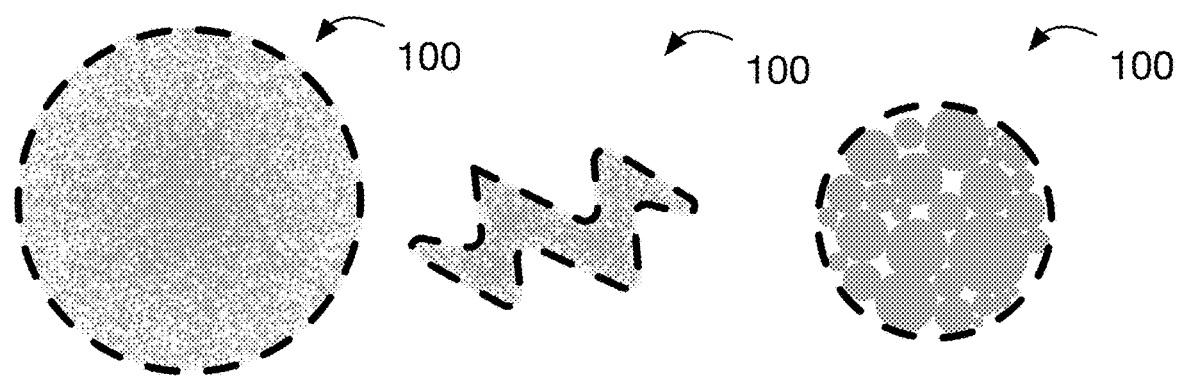
FIGS. 1A-1F are schematic representations of examples of the silicon material.
Figures 1D, 1E, 1F:
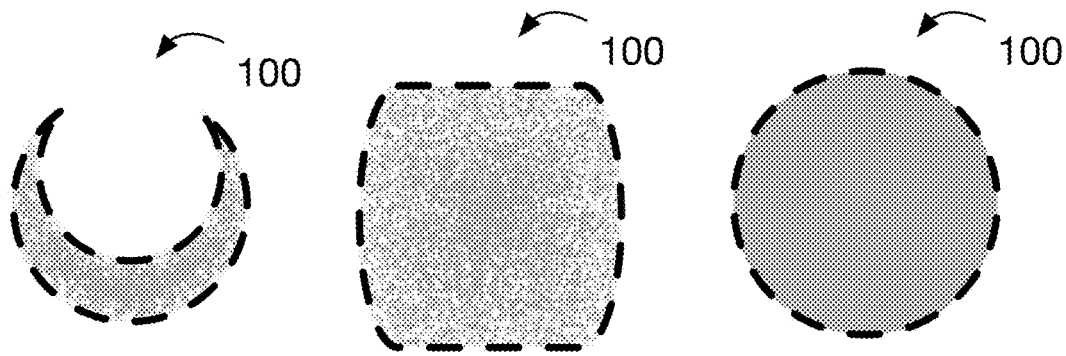
Figure 9A:
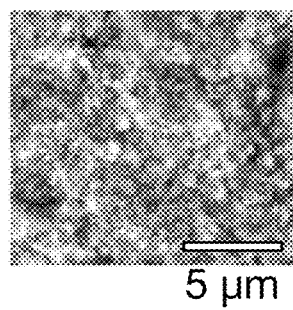
FIG. 9A shows exemplary scanning electron micrographs of a silicon material before and after continuous ball milling.
Figure 9A:
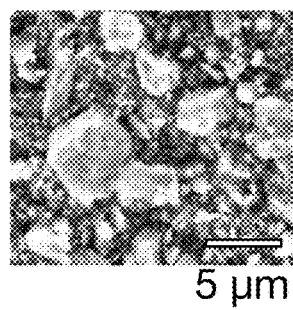
Figure 9B:
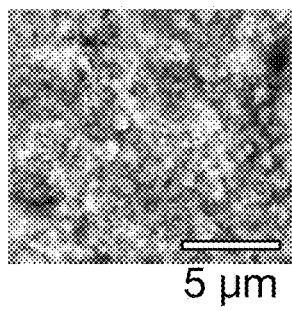
FIG. 9B shows exemplary scanning electron micrographs of a silicon material before and after intermittent ball milling.
Figure 9B:
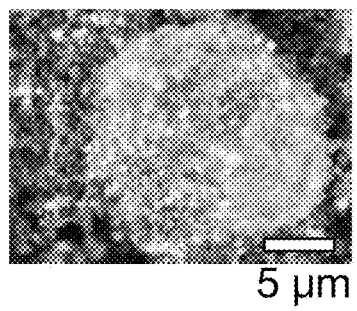

In some variants, the silicon material can include carbon. For example, the silicon material can be coated with carbon; form a composite, alloy, compound (e.g., silicon carbide), material, and/or other chemical species with carbon; and/or can otherwise include carbon. The carbon can be homogeneous distributed or inhomogeneously distributed (e.g., forming one or more carbon rich and/or carbon poor grains, forming carbon clusters, etc.). The carbon can include: polymers, amorphous carbon, graphite, nanocarbon, and/or any suitable carbon material. In these variants, the total carbon content (e.g., by weight, by volume, by stoichiometric ratio, etc.) can be between 1-99% (e.g., where the remainder can include silicon and/or any suitable trace elements) by weight, by volume, by stoichiometry, and/or according to any suitable reference. However, the carbon content can be less than 1% or greater than 99%. In a first specific example, a silicon material can include at least 50% silicon, and between 1-45% carbon, where the percentages can refer to a mass percentage of each component. In this specific example, the silicon material can include at most about 5% oxygen. In a second specific example, a silicon material can include approximately 85-93% silicon, approximately 2-10% carbon, and approximately 5-10% oxygen, where the percentages can refer to a mass percentage of each component. However, any suitable The shape of the particles can be spheroidal (e.g., spherical, ellipsoidal, as shown for example in FIG. 1A, FIG. 1C, FIG. 1F, etc.); rod; platelet; star; pillar; bar; chain; flower; reef; whisker; fiber; box; polyhedral (e.g., cube, rectangular prism, triangular prism, frustopyramidal, as shown for example in FIG. 1E, FIG. 9A, etc.); frustoconical, have a worm-like morphology (e.g., vermiform, as shown for example in FIG. 1B, etc.); have a foam like morphology; have an egg-shell morphology; have a shard-like morphology (e.g., as shown for example in FIG. 1D or 6A-6C); include one or more straight edges (e.g., meeting at rounded corners, at sharp corners, etc. as shown for example in FIG. 1E, FIG. 5A, FIG. 5B, FIG. 5C, FIG. 9A, etc.) and/or have any suitable morphology. The particles can be freestanding, clustered, aggregated, agglomerated, interconnected, and/or have any suitable relation or connection(s). As an illustrative example, a silicon material can include a plurality of fused particles 200 (e.g., clusters, agglomers, agglomerates, etc.), where each fused particle includes a plurality of individual particles that have fused (e.g., been cold welded) together (e.g., without substantially changing a morphology of the underlying particles, by melding the underlying particles at points of intersection, by fusing or sealing a surface of the fused particle and retaining a surface area of the unfused particles, etc.; with a change in the morphology of the individual particles; etc.).

A characteristic size of the particles is preferably between about 1 nm to about 2000 nm such as 2 nm, 5 nm, 10 nm, 20 nm, 25 nm, 30 nm, 50 nm, 75 nm, 100 nm, 125 nm, 150 nm, 175 nm, 200 nm, 250 nm, 300 nm, 400 nm, 500 nm, 1000 nm, or 1500 nm. However, the characteristic size can additionally or alternatively be less than about 1 nm and/or greater than about 2000 nm. For instance (as shown for example in FIG. 5A, 9A, or 10A), a fused particle can have a characteristic size between about 1 µm and 10 µm (e.g., 1-3 µm, 3-5 µm, 5-10 µm, 3-10 µm, 3-7 µm, 1-5 µm, 1-7 µm, 0.9-3 µm, 8-12 µm, other values or ranges therein, etc.), and the particles that make up the fused particle can have a characteristic size between about 2 and 500 nm (e.g., 1-10 nm, 10-50 nm, 10-100 nm, 20-200 nm, 50-500 nm, 50-525 nm, 10-550 nm, 100-500 nm, values or ranges therein, etc.). The characteristic size can include the radius, diameter, circumference, longest dimension, shortest dimension, length, width, height, pore size, a shell thickness, and/or any size or dimension of the particle. The characteristic size of the particles is preferably distributed on a size distribution. The size distribution can be a substantially uniform distribution (e.g., a box distribution, a mollified uniform distribution, etc. such that the number of particles or the number density of particles with a given characteristic size is approximately constant), a Weibull distribution, a normal distribution, a log-normal distribution, a Lorentzian distribution, a Voigt distribution, a log-hyperbolic distribution, a triangular distribution, a log-Laplace distribution, and/or any suitable distribution. The characteristic size distribution of the particles (particularly, but not exclusively for fused particles) is preferably narrow (e.g., standard deviation is less than about 20% of a mean of the size distribution), but can be broad (e.g., a standard deviation greater than about 20% of a mean of the size distribution), and/or can otherwise be characterized. A narrow characteristic size distribution can provide a technical advantage of enhancing a lifetime and/or stability of the silicon material as some undesirable processes depend on a size of the silicon material (and having more uniform size such as with a narrow distribution can lead to more uniform degradation within the sample).

The characteristic size (and its associated distributions) are typically determined directly (e.g., by directly imaging the silicon material such as using scanning electron microscopy, transmission electron microscopy, scanning transmission microscopy, etc.), but can be determined indirectly (e.g., based on scattering experiments such as dynamic light scattering; based on optical properties such as bandgap energy, bandgap width, etc.; based on x-ray scattering such as based on a width of x-ray scattering; etc.), and/or can otherwise be determined.

The particles can be solid, hollow, porous, as shown for example in FIGS. 1A-1F, and/or have any structure.

The interior (e.g., volume of the material that is not in contact with an environment proximal an external environment) of the silicon material is preferably porous. However, the entire silicon material can be porous (e.g., an exterior surface of the silicon material can include pores), and/or the silicon material can otherwise be configured. The particles can be porous, the space between particles (e.g., within a particle cluster, agglomer, fused particle, etc.) can cooperatively define pores, and/or the silicon material can otherwise include pores. The pores can have a polygonal shape (e.g., square, rectangle, hexagonal, etc.), an ovate shape, an elliptical shape (e.g., circular), random shape, and/or any suitable shape. The pore distribution throughout the silicon material can be: substantially uniform, random, engineered (e.g., form a gradient along one or more axes), or otherwise configured.

A porosity of the silicon material (e.g., a porosity of the interior of the silicon material) is preferably between about 5% and 90%, but can be less than 5% or greater than 90%. The porosity can depend on the silicon material morphology (e.g., particle size, characteristic size, shape, etc.), silica source, impurities in the silica or silicon, silicon source, silica reduction, and/or any suitable properties. A pore volume of the silicon material is preferably between about 0.02 and 5 $cm^3g^{-1}$, but can be less than 0.02 $cm^3g^{-1}$ or greater than 5 $cm^3g^{-1}$. The pore size of the silicon material is preferably between about 0.5 and 200 nm, but the pore size can be smaller than 0.5 nm or greater than 200 nm.

The pore size distribution can be monomodal or unimodal, bimodal, polymodal, uniformly distributed, and/or have any suitable number of modes. In specific examples, the pore size distribution can be represented by (e.g., approximated as) a gaussian distribution, a Lorentzian distribution, a Voigt distribution, a uniform distribution, a mollified uniform distribution, a triangle distribution, a Weibull distribution, power law distribution, log-normal distribution, log-hyperbolic distribution, skew log-Laplace distribution, asymmetric distribution, skewed distribution, and/or any suitable distribution.

In variants, the pore characteristics can be determined or measured using direct measurements (e.g., determining a bulk volume and a volume of the skeletal material without pores), nitrogen absorption, intrusion porosimetry (e.g., mercury-intrusion porosimetry), computed tomography, optical methods, water evaporation methods, gas expansion methods, thermoporosimetry, cryoporometry, and/or using any suitable method(s).

The silicon material can be crystalline, amorphous, nanocrystalline, protocrystalline, and/or have any suitable crystallinity. When the silicon material (e.g., particles thereof) include crystalline regions, the silicon material is preferably polycrystalline, which can provide a technical advantage of accommodating mechanical or other stresses that the silicon material undergo. However, the silicon material can be monocrystalline. In some examples, the silicon particles can include crystalline regions and non-crystalline regions (e.g., amorphous regions). For example, an external surface of a silicon particle (e.g., fused particle) can be amorphous and an internal structure of the silicon can be crystalline. However, the particles can include a mixture of amorphous grains and crystalline grains, grains with different compositions (e.g., different amounts of carbon, silicon, oxygen, dopants, etc. with different grains), and/or can include any suitable structure or composition. The grain size can depend on the manufacture process (e.g., method parameters as described below), the material composition (e.g., amount of carbon, oxygen, dopants, silicon, etc.), particle size, source material, and/or any suitable properties. For example, the grain size can be between about 10 nm and 10 µm (e.g., as measured using electron diffraction, neutron diffraction, xray diffraction, imaging such as SEM or TEM, etc.). However, the grains can have any suitable size, composition, and/or other properties.

The exterior surface of the silicon material is preferably substantially sealed (e.g., hinders or prevents an external environment from penetrating the exterior surface). However, the exterior surface can be partially sealed (e.g., allows an external environment to penetrate the surface at a predetermined rate, allows one or more species from the external environment to penetrate the surface, etc.) and/or be open (e.g., porous, include through holes, etc.). The exterior surface can be defined by a thickness or depth of the silicon material. The thickness is preferably between about 1 nm and 10 µm (such as 1 nm, 2 nm, 3 nm, 5 nm, 10 nm, 20 nm, 50 nm, 100 nm, 200 nm, 500 nm, 1 µm, 2 µm, 5 µm, 10 µm, values therebetween), but can be less than 1 nm or greater than 10 µm. The thickness can be homogeneous (e.g., approximately the same around the exterior surface) or inhomogeneous (e.g., differ around the exterior surface).

In specific examples, the exterior surface can be welded, fused, melted (and resolidified), and/or have any morphology. The exterior surface can be prepared as described in S200 (e.g., one or more instances of performing step S200) and/or otherwise be prepared.

The (specific) surface area of the exterior surface of the silicon material is preferably small (e.g., less than about 0.01, 0.5 m$^2$/g, 1 m$^2$/g, 2 m$^2$/g, 3 m$^2$/g, 5 m$^2$/g, 10 m$^2$/g, 15 m$^2$/g, 20 m$^2$/g, 25 m$^2$/g, 30 m$^2$/g, 50 m$^2$/g, values or between a range thereof), but can be large (e.g., greater than 10 m$^2$/g, 15 m$^2$/g, 20 m$^2$/g, 25 m$^2$/g, 30 m$^2$/g, 50 m$^2$/g, 75 m$^2$/g, 100 m$^2$/g, 110 m$^2$/g, 125 m$^2$/g, 150 m$^2$/g, 175 m$^2$/g, 200 m$^2$/g, 300 m$^2$/g, 400 m$^2$/g, 500 m$^2$/g, 750 m$^2$/g, 1000 m$^2$/g, 1250 m$^2$/g, 1400 m$^2$/g, ranges or values therebetween, >1400 m$^2$/g) and/or any suitable value.

The (specific) surface area of the interior of the silicon material (e.g., a surface exposed to an internal environment that is separated from with an external environment by the exterior surface, a surface exposed to an internal environment that is in fluid communication with an external environment across the exterior surface, interior surface, etc.) is preferably large (e.g., greater than 10 m$^2$/g, 15 m$^2$/g, 20 m$^2$/g, 25 m$^2$/g, 30 m$^2$/g, 50 m$^2$/g, 75 m$^2$/g, 100 m$^2$/g, 110 m$^2$/g, 125 m$^2$/g, 150 m$^2$/g, 175 m$^2$/g, 200 m$^2$/g, 300 m$^2$/g, 400 m$^2$/g, 500 m$^2$/g, 750 m$^2$/g, 1000 m$^2$/g, 1250 m$^2$/g, 1400 m$^2$/g, ranges or values therebetween, >1400 m$^2$/g), but can be small (e.g., less than about 0.01, 0.5 m$^2$/g, 1 m$^2$/g, 2 m$^2$/g, 3 m$^2$/g, 5 m$^2$/g, 10 m$^2$/g, 15 m$^2$/g, 20 m$^2$/g, 25 m$^2$/g, 30 m$^2$/g, 50 m$^2$/g, values or between a range thereof). However, the surface area of the interior can be above or below the values above, and/or be any suitable value.

In some variants, the surface area can refer to a Brunner-Emmett-Teller (BET) surface area. However, any definition, theory, and/or measurement of surface area can be used. The surface area can be determined, for example, based on calculation (e.g., based on particle shape, characteristic size, characteristic size distribution, etc. such as determined from particle imaging), adsorption (e.g., BET isotherm), gas permeability, mercury intrusion porosimetry, and/or using any suitable technique. In some variations, the surface area (e.g., an internal surface area) can be determined by etching the external surface of the material (e.g., chemical etching such as using nitric acid, hydrofluoric acid, potassium hydroxide, ethylenediamine pyrocatechol, tetramethylammonium hydroxide, etc.; plasma etching such as using carbon tetrafluoride, sulfur hexafluoride, nitrogen trifluoride, chlorine, dichlorodifluoromethane, etc. plasma; focused ion beam (FIB); etc.), by measuring the surface area of the material before fusing or forming an external surface, and/or can otherwise be determined. However, the surface area (and/or porosity) can be determined in any manner.

In a first illustrative example, the silicon material can have a structure (particularly but not exclusively an interior structure) that is substantially the same as that described for a silicon material disclosed in U.S. patent application Ser. No. 17/322,487 titled 'POROUS SILICON AND METHOD OF MANUFACTURE filed 17 May 2021, U.S. patent application Ser. No. 17/525,769 titled 'SILICON MATERIAL AND METHOD OF MANUFACTURE' filed 12 Nov. 2021, U.S. patent application Ser. No. 17/667,361 titled 'SILICON MATERIAL AND METHOD OF MANUFACTURE' filed 8 Feb. 2022, each of which is incorporated in its entirety by this reference. However, the silicon material can have any suitable structure.

In a second illustrative example, the silicon material can include a plurality of solid silicon particles with a characteristic size between about 100-500 nm. In this illustrative example, the solid silicon particles preferably have a surface area (e.g., measured, external surface area, etc.) between about 1-20 m$^2$/g (e.g., 1, 5, 10, 11, 12, 13, 14, 15, 16, 17, 18, 19, 20, values or ranges therebetween, etc.), but can have any suitable surface area. In variations of the second illustrative example, the solid silicon particles can be fused together to form fused silicon particles (e.g., with a characteristic size between about 1-10 µm). The fused silicon particles can be internally porous (e.g., defining a void space between the particles making up the fused particle).

In a third illustrative example, the silicon material can include fused particles made up from porous silicon particles. The porous silicon particles can have a characteristic size between about 2-500 nm. In this specific example, the fused particles preferably have an external surface area that is between about 1-20 m$^2$/g (e.g., 1, 5, 10, 11, 12, 13, 14, 15, 16, 17, 18, 19, 20, values or ranges therebetween, etc.), but can have any suitable surface area.

In variations of the above specific examples, the silicon material can include a coating 300. The coated materials (e.g., silicon particles coated with a coating) preferably have a smaller surface area (e.g., a smaller external surface area) than the underlying material. For instance, the coated material can have a surface area that is approximately half of the surface area of the underlying material. The coating is preferably carbonaceous (e.g., graphite, graphene, nanotubes, graphene oxide, graphite oxide, polymers, etc.), but can additionally or alternatively include oxides and/or any suitable materials.

4. Method

The method preferably functions to manufacture a silicon material (e.g., as described above), but can function to manufacture any silicon material and/or any suitable material. As shown in FIG. 2, a method for manufacturing a silicon material can include comminuting silicon S200. The method can optionally include reducing a silica precursor to silicon S100, washing the silicon S300, processing the silicon S400, and/or any suitable steps. Steps of the method can be prepared in a continuous process (e.g., sequentially without significant delays between steps), in batches, in contemporaneous or simultaneous processed, using delayed processes, and/or with any suitable timing.

The method and/or steps thereof can be performed in a single chamber (e.g., a furnace, an oven, etc.) and/or in a plurality of chambers (e.g., a different chamber for each step or substep, a heating chamber, a coating chamber, a milling chamber, a comminution chamber, a fusion chamber, a washing chamber, etc.). The method can be performed on a laboratory scale (e.g., microgram, milligram, gram scale such as between about 1 μg and 999 g), manufacturing scale (e.g., kilogram, megagram, etc. such as between about 1 kg and 999 Mg), and/or any suitable scale.

The method can use a silica starting material (e.g., in variants of the method including S100, in variants of the method that reduce the silica to silicon, etc.), a silicon starting material, silicon carbide (and/or other alloys, composites, materials, etc. that include silicon and carbon), and/or any suitable material. The starting materials can be derived from waste materials (e.g., silica, silicon, etc. generated as a byproduct from another process), recycled materials (e.g., reusing silica, silicon, etc. from another use), pristine materials (e.g., newly manufactured silica, silicon, etc.), and/or any suitable starting material. The starting material can be washed (e.g., to remove one or more impurities such as using solvents, acids, bases, etc.; as described in S300; etc.) or not washed (e.g., include one or more impurities) before further processing. Examples of a silica starting material include: sol-gel silica (e.g., silica prepared according to the Stöber method), fume silica, diatoms, glass, quartz, fumed silica, silica fumes, Cabosil fumed silica, aerosil fumed silica, sipernat silica, precipitated silica, silica gels, silica aerogels, decomposed silica gels, silica beads, silica sand, silica dust, and/or any suitable silica. Examples of silicon starting materials include: silicon shards (as shown for example in FIG. 10A), high-purity (e.g., with a silicon composition greater than 90%, 95%, 97.5%, 98%, 99%, 99.5%, 99.9%, 99.99%, 99.995%, 99.999%, etc. by weight, by mass, by volume, by atomic purity, etc.) silicon particles, silicon particle waste from silicon wafer production, silicon dust, recycled silicon solar cells, silicon sludge, silicon debris, silicon particles (e.g., silicon nanoparticles, silicon microparticles, silicon macroparticles, silicon material disclosed in U.S. patent application Ser. No. 17/322,487 titled 'POROUS SILICON AND METHOD OF MANUFACTURE filed 17 May 2021, U.S. patent application Ser. No. 17/525,769 titled 'SILICON MATERIAL AND METHOD OF MANUFACTURE' filed 12 Nov. 2021, U.S. patent application Ser. No. 17/667,361 titled 'SILICON MATERIAL AND METHOD OF MANUFACTURE' filed 8 Feb. 2022, each of which is incorporated in its entirety by this reference, etc.), and/or any suitable silicon.

Reducing silica S100 functions to reduce a silica starting material to silicon. S100 can additionally or alternatively function to introduce pores in the silica material (e.g., by forming porous silicon from solid silica), and/or otherwise function. The resulting silicon is preferably porous, but can be nonporous, cooperatively define pores between silicon particles and/or have any morphology. The resulting silicon can retain have a different structure from the structure of the starting silica material.

Figure 7:
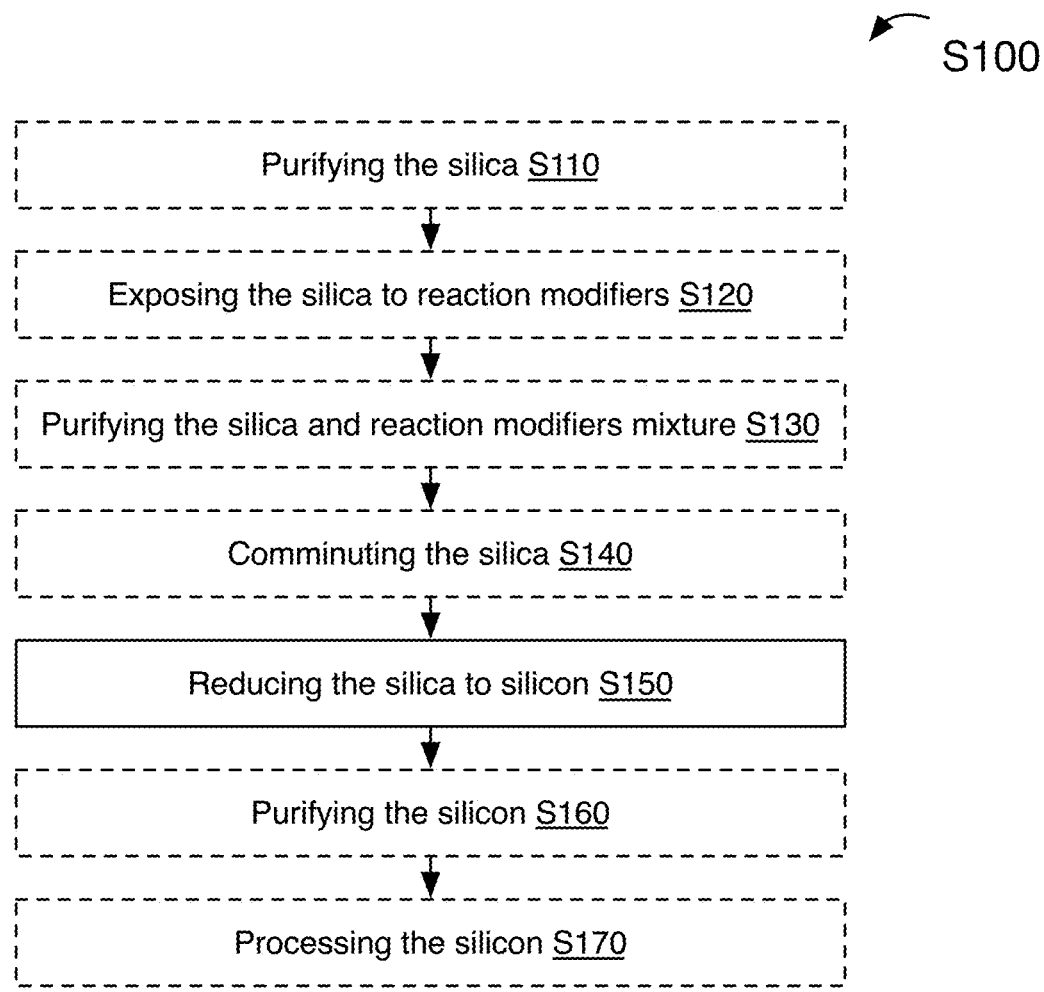
FIG. 7 is a block diagram representation of an example of reducing silica starting material.

As shown for example in FIG. 7, reducing the silica starting material can include: purifying the silica starting material S110, exposing the silica starting material to one or more reaction modifiers S120, purifying the silica and reaction modifier mixture S130, comminuting the silica starting material S140, reducing the silica starting material S150, purifying the resulting silicon S160, processing the resulting silicon S170, and/or any suitable steps. Reducing the silica starting material can optionally include melting the silicon (for example as described below) and/or any suitable step(s). In an illustrative example, reducing the silica and/or steps thereof can include any steps or processes as disclosed in U.S. patent application Ser. No. 17/097,774 titled 'METHOD OF MANUFACTURE OF POROUS SILICON' filed 13 Nov. 2020, which is incorporated in its entirety by this reference. However, reducing the silica starting material can be performed in any steps.

In an illustrative example, reducing the silica starting material can include: mixing the silica starting material with a salt (e.g., sodium chloride), mixing the silica starting material with a reducing material (e.g., magnesium, aluminium, etc.), and heating the silica starting material to a reduction temperature (e.g., 500° C., 600° C., 700° C., 800° C., 900° C., 1000°, 1200° C., temperatures therebetween, etc.) for between 1-24 hours. However, the silica starting material can otherwise be reduced.

During the silica reduction (e.g., during S150), it can be beneficial to heat the silica starting material in steps (e.g., raising a temperature of the silica material and then maintaining the silica starting material at that temperature for an amount of time before raising the temperature further) to minimize the generation of local hot spots and to help avoid melting of the starting silica material. In an illustrative example, the silica starting material can be heated to a reduction temperature along a series of temperature steps such as holding the starting material at 300° C., 350° C., 400° C., 450° C., 500° C., 550° C., 600° C., 650° C., 700° C. and/or at any suitable temperatures between a beginning temperature and the target reduction temperature. In some variations of this illustrative example, the amount of time and/or the target temperature steps can be determined based on a measured outgassing and/or pressure within the reaction vessel. However, the amount of time and/or the target temperature steps can be determined heuristically, empirically, based on a look-up table, based on the silica starting material, based on a target silicon (or ultimate silica) structure, and/or otherwise be determined.

Comminuting the silicon S200 can function to crush, grind, fuse, bind, and/or otherwise modify a characteristic size, characteristic size distribution, shape, and/or other property of the silicon material. S200 can be performed in the same or a different chamber as S100 and/or S300. S200 can be performed at the same time as or after S100. Comminuting the silicon can include crushing the silicon, grinding the silicon, milling the silicon, cutting the silicon (e.g., nanocutting), vibrating the silicon (e.g., using a vibrator, vibration grinder, etc.), and/or any suitable processes.

S200 can additionally or alternatively be performed on a silica starting material (e.g., to form fused silica particles which can then be reduced such as according to S100), and/or on any suitable material(s).

In some variants (e.g., when S100 is not performed), S200 can include receiving a silicon material. The received silicon material can include nanoparticles, mesoparticles, microparticles, macroparticles, powders, and/or any suitable silicon material. The received silicon material can be porous, solid, and/or have any suitable morphology. The received silicon material can have a large surface area (e.g., >10 m$^2$/g, >50 m$^2$/g, >100 m$^2$/g, >150 m$^2$/g, >200 m$^2$/g, >250 m$^2$/g, >300 m$^2$/g, >500 m$^2$/g, values or ranges therebetween, etc.), a small surface area (e.g., <0.1 m$^2$/g, <0.5 m$^2$/g, <1 m$^2$/g, <2 m$^2$/g, <5 m$^2$/g, <10 m$^2$/g, <15 m$^2$/g, <20 m$^2$/g, values or ranges therebetween, etc.), and/or can have any suitable surface area.

In a first illustrative example, a received silicon material can include microparticles (e.g., with a characteristic size between about 1-100 μm). In a second illustrative example, a received silicon material can include nanoparticles (e.g., with a characteristic size between about 10 nm and 500 nm). In a third illustrative example, a received silicon material can include a broad range of silicon particles (e.g., a mixture of nanoparticles and microparticles; nanoparticles and mesoparticles; mesoparticles and microparticles; nanoparticles, mesoparticles, and microparticles; etc.). However, any suitable silicon material can be received (e.g., a silicon material as disclosed in U.S. patent application Ser. No. 17/097,774 titled 'METHOD OF MANUFACTURE OF POROUS SILICON' filed 13 Nov. 2020, U.S. patent application Ser. No. 17/525,769 titled 'SILICON MATERIAL AND METHOD OF MANUFACTURE' filed 12 Nov. 2021, and/or U.S. patent application Ser. No. 17/667,366 titled 'SILICON MATERIAL AND METHOD OF MANUFACTURE' filed 8 Feb. 2022 each of which is incorporated in its entirety by this reference).

Figure 3A:
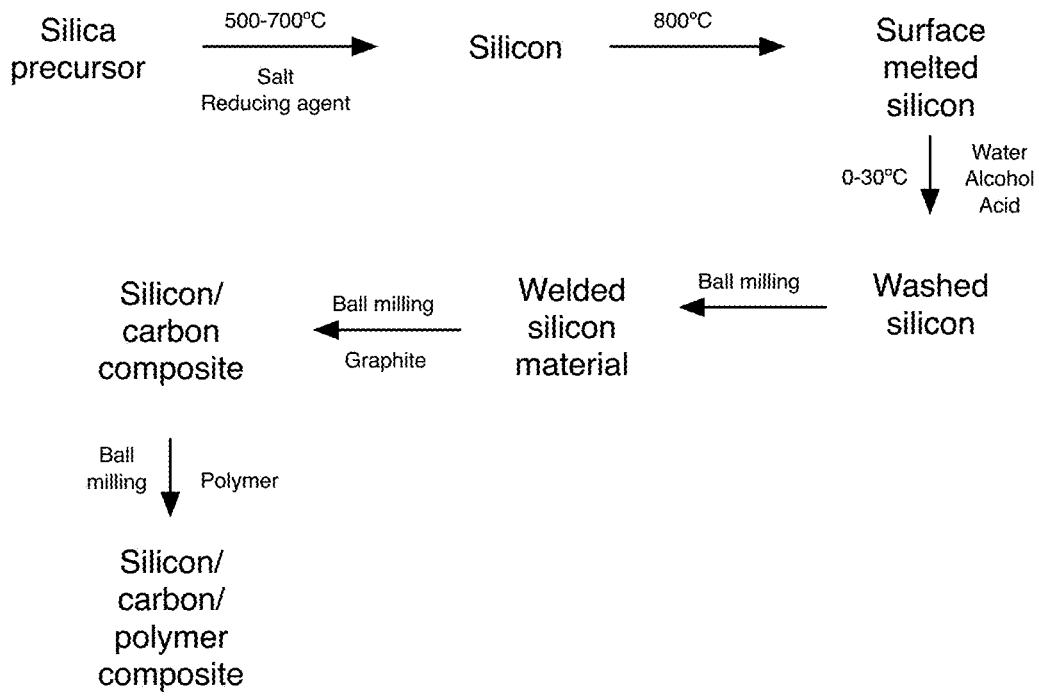
FIGS. 3A and 3B are schematic representations of examples of silicon material manufacture.
Figure 3B:
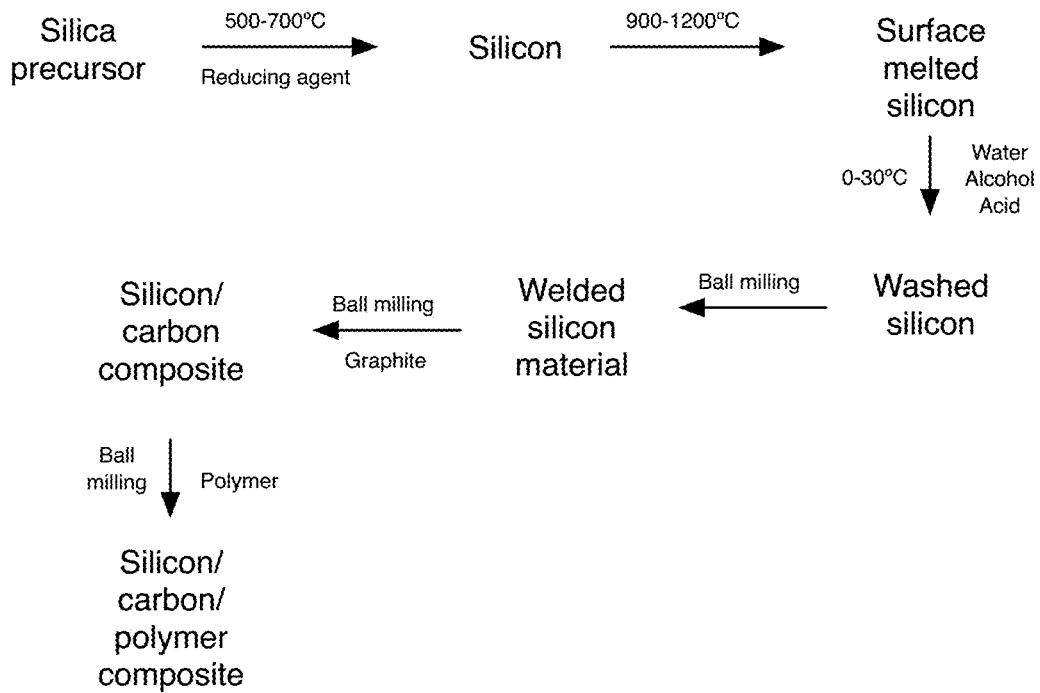
Figure 4:
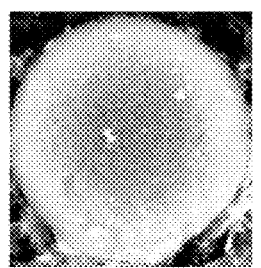
FIG. 4 is a scanning electron micrograph of exemplary silicon materials before and after melting.
Figure 4:
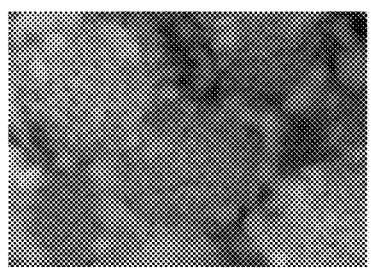
Figure 5A:
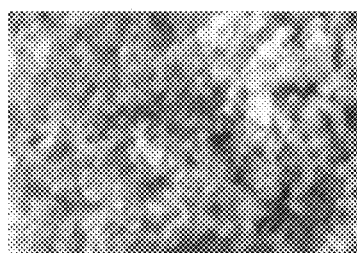
FIGS. 5A, 5B, and 5C are scanning electron micrographs of exemplary silicon materials before and after ball milling.
Figure 5A:
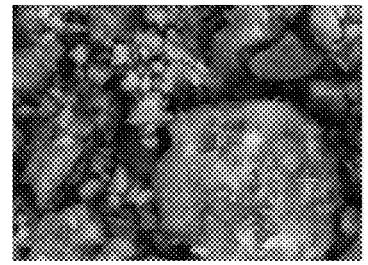
Figure 5B:
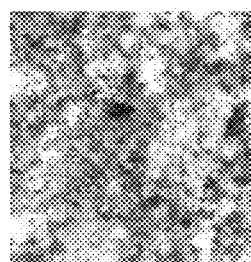
Figure 5B:
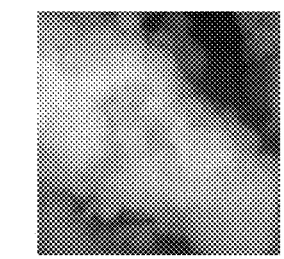
Figure 5C:
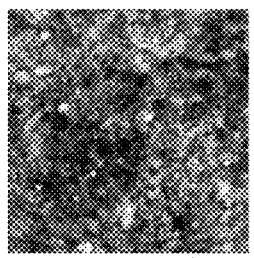
Figure 5C:
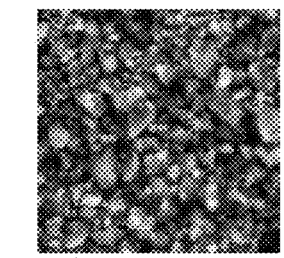
Figure 6A:
FIGS. 6A, 6B, and 6C are scanning electron micrographs of exemplary shell shaped silicon material after surface melting.
Figure 6B:
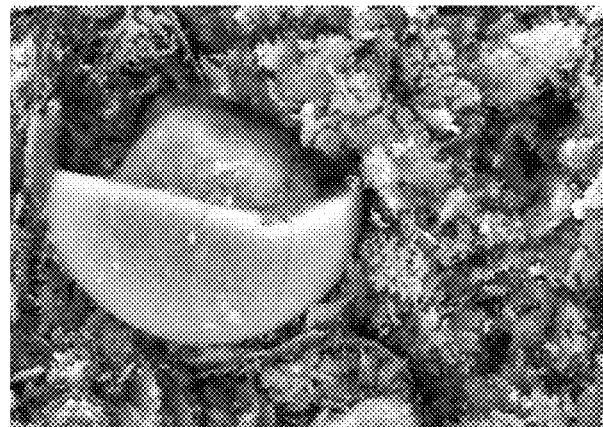
Figure 6C:
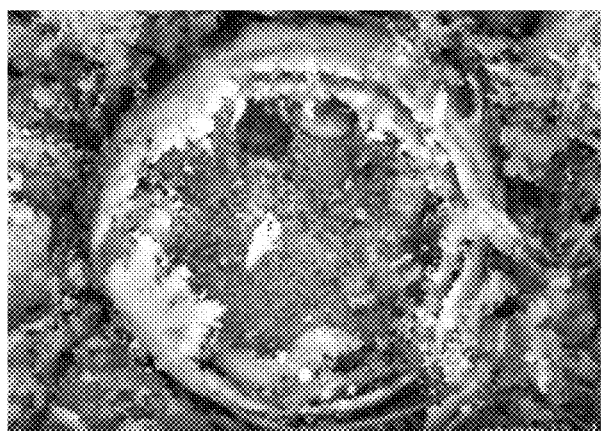
Figure 11:
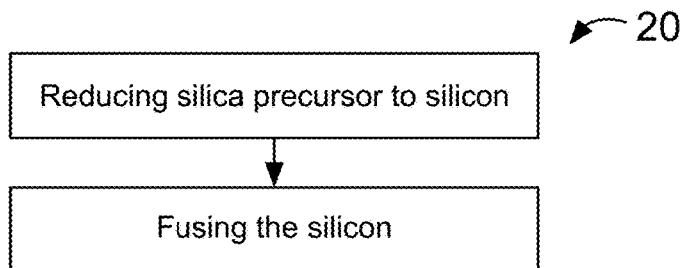
FIG. 11 is a flow chart representation of an example of the method.
Figure 12:
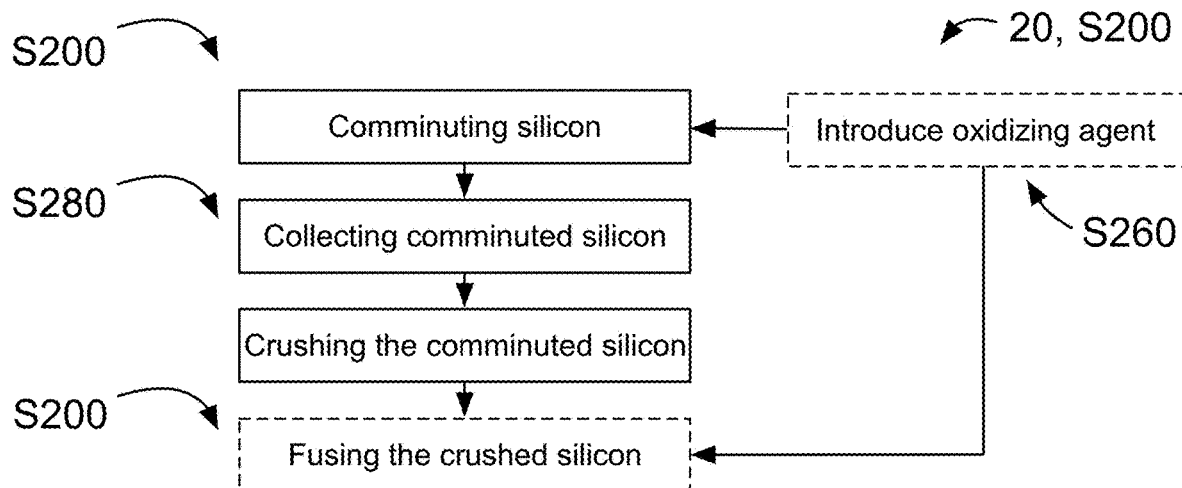
FIG. 12 is a flow chart representation of an example of the method.

Comminuting the silicon can be performed in a single stage (e.g., as shown for example in FIG. 11) and/or a plurality of stages (e.g., such as two stages, three stages, four stages, ten stages, etc.; as shown for example in FIG. 3A, FIG. 3B, FIG. 12, etc.; etc.). Comminuting the silicon in stages can be beneficial, for example, because comminution agents (e.g., carbonaceous milling agents such as graphite or polymers) can function as lubricants during the comminution process, which can inhibit or decrease an extent of fusion of the silicon material (e.g., the silicon material is milled more poorly than would occur if the milling agent were not present). The comminution stages can be discrete stages (e.g., where the comminution tool is stopped between stages) and/or continuous stages (e.g., where processes or comminution properties are changed continuously or discretely between steps such as adding comminution agents while the silicon material is being comminuted). The comminution stages can be changed automatically or manually. The comminution stage can be changed automatically, manually, responsive to a comminution criterion, and/or in any manner. Examples of comminution criterion include: a silicon material surface area, a comminution time, a comminution temperature, a comminution agent property (e.g., activated or cyclized state of a polymer), a mixture homogeneity, a silicon material starting property (e.g., mean characteristic size of a starting material, characteristic size distribution of a starting material, particle shape, etc.), a target comminuted particle property (e.g., target surface area, target characteristic size, target characteristic size distribution, etc.), and/or any suitable comminution criterion. However, the comminution stage can otherwise be changed. Each stage of comminution can have the same or different milling properties and/or be otherwise related or distinct.

Figure 13:
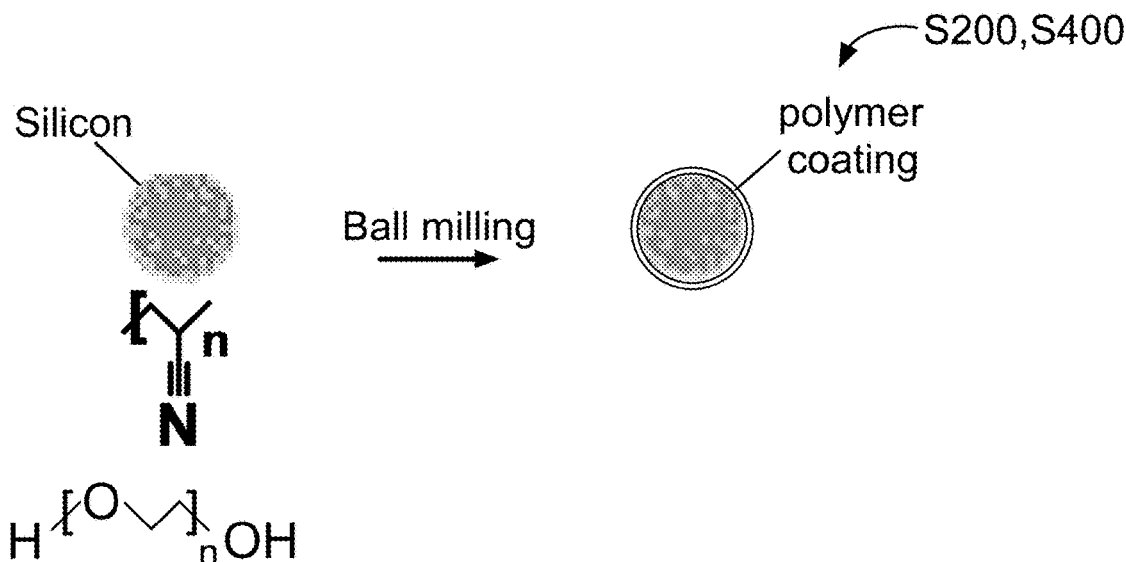
FIG. 13 is a schematic representation of an example of coating a silicon material.

In a first illustrative example, a first comminution stage, which can function to reduce a surface area (e.g., external surface area) of the silicon material, can include milling the silicon material (e.g., to produce fused silicon particles); a second comminution stage (e.g., performed after the first milling stage such as after the surface area of the silicon material is at most a predetermined value, after a predetermined amount of time, etc.), which can function to form a (more) homogenous distribution and/or add in material (e.g., graphite), can include milling the silicon material with graphite (e.g., milling the fused particles with graphite); and a third milling stage (e.g., performed after the second milling stage), which can function to form a homogenous distribution, add in material (e.g., polymer), and/or activate the polymer, can include milling the silicon material (e.g., the fused particles, the fused particle and graphite, etc.) with polymer (e.g., PAN). In a first variation of this illustrative example, the first milling stage can include milling the silicon material and the second milling stage can include milling the silicon material with graphite and polymer (e.g., PAN). In a second variation of this illustrative example, a first milling stage can include milling the silicon material, a second milling stage can include milling the silicon material with polymer (e.g., PAN), and a third milling stage can include milling the silicon material with graphite. In a third variation of this illustrative example (as shown for instance in FIG. 13) a milling stage can include milling the silicon material with graphite and polymer (e.g., PAN, PEO, etc.). However, the silicon material can otherwise be milled.

Figure 10A:
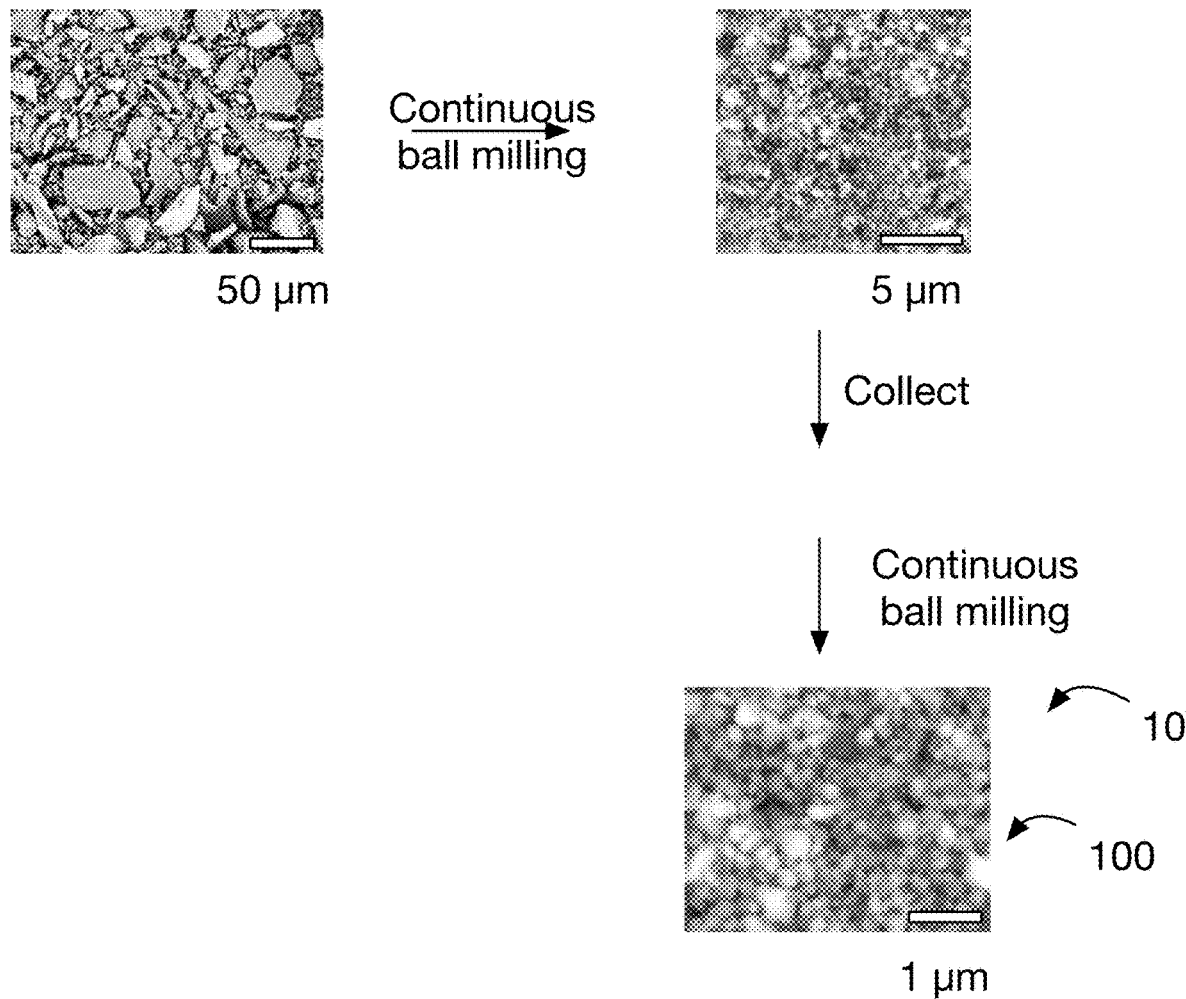
FIG. 10A shows exemplary scanning electron micrographs of a silicon material before and after a first ball milling process, collection, and a second ball milling process.
Figure 10B:
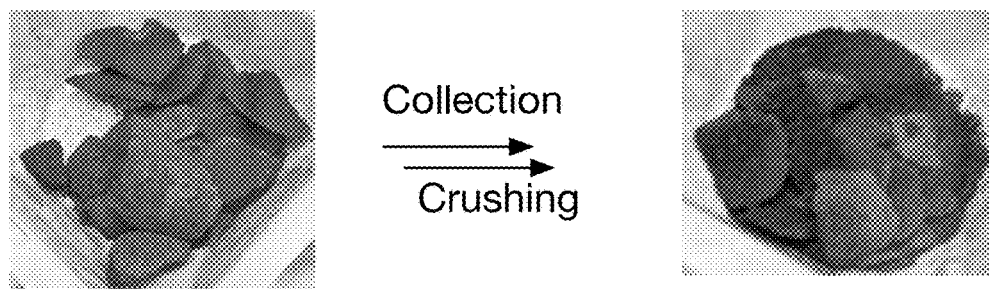
FIG. 10B shows exemplary black and white pictures of a silicon material before and after collection and crushing (e.g., in between the first and second ball milling processes).

In a second specific example of using a plurality of comminution processes, a first comminution process (e.g., stage) can be performed to modify (e.g., reduce, decrease, increase, etc.) a particle size (e.g., an average characteristic size, a characteristic size distribution, etc.), and a second comminution process (e.g., stage) can be performed to fuse the particles. In this specific example, the first comminution process can include milling (e.g., ball milling) a silicon material at a rate between about 500 and 1500 rpm for between 1 and 24 hours (e.g., to break, shrink, etc. the particles into smaller particles). The second comminution process parameters can be the same as the first comminution process (e.g., a rate between about 500 and 1500 rpm for between 1 and 24 hours). The second comminution process can, for instance, function to fuse the silicon particles into a fused particle (e.g., where different functions can occur despite similar processing parameters because of the different input particle sizes). For illustrative purposes (as illustrated in FIG. 10A for instance), the initial (e.g., before the first comminution process) silicon particles can have a characteristic size (e.g., mean characteristic size, distribution of sizes between, etc.) about 1-100 µm, after the first comminution process the silicon particles can have a characteristic size of about 10-500 nm, and after the second comminution process the silicon particles can have a characteristic size between about 1 and 10 µm. However, the silicon particles can have any suitable size during or between the comminution processes. In variations of the second specific example, the silicon material can be collected between the comminution processes. After the first comminution process, the silicon material can be caked (e.g., form a cohesive block, as shown for example in FIG. 10B). When the silicon material forms a cohesive block, collecting the silicon material preferably includes crushing, grinding, milling (e.g., at a low speed such as less than 500 rpm, 200 rpm, 100 rpm, 50 rpm, 10 rpm, etc.), and/or otherwise converting the block into a powder (e.g., as shown for example in FIG. 10B, where the powder can be used in the second comminution process, using a mortar and pestle, using a crusher, using a grinder, using a mill, etc.). In a second variation (that may be combined with or separate from the first variation), the silicon material can be comminuted with one or more carbonaceous material (e.g., graphite, polymers, etc.), which can coat, intercalate within (e.g., form an alloy, material, composite, etc.), fill a void space, and/or otherwise be included within the silicon material (and/or be removed during further processing).

Comminuting the silicon material can, for instance, be used to reduce a characteristic size (e.g., mean characteristic size) of the silicon material and/or break up agglomers, aggregates, clusters, particles (e.g., particles with a size larger than a threshold size, all particles, etc.) within the silicon material (e.g., into constituent particles, into constituent grains, into smaller particles, etc.). For example, particles with a characteristic size (e.g., mean characteristic size) between about 1-100 µm (e.g., 1-10 µm, 1-20 µm, 5-50 µm, 20-50 µm, 10-100 µm, etc.) can be reduced (e.g., shrunk, broken, etc.) to particles with a characteristic size (e.g., a mean characteristic size) between about 100 nm and 5 μm (e.g., 100-500 nm, 90-200 nm, 100-1000 nm, 200-2000 nm, 500-5000 nm, 100-5500 nm, etc.). However, the silicon material can include particles, clusters, and/or agglomers with any suitable size.

Comminuting the silicon S200 can additionally or alternatively function to fuse a portion of the silicon material (e.g., can include fusing the silicon material S220), to reduce the surface area (e.g., the exposed surface area, the external surface area, etc.) of the silicon, and/or can otherwise function. The portion is preferably an exterior surface of the silicon, but can include an interior surface, a fraction of the silicon material, and/or any suitable portion (up to and including the entirety) of the silicon. In these variants, comminuting the silicon can lead to the formation of fused silicon particles, which can form, for instance, by fusing two or more particles into a single fused silicon particle. In a specific example, fusing particles preferably includes cold welding the particles together (e.g., fusing the particles without liquid or molten material present at the point of contact; at a temperature below a melting temperature of silicon, carbon, comminuting agents, milling agents, etc.; etc.). Comminuting the silicon particles preferably does not lead to spherification of the silicon material. In some variants, this can be achieved by continuously comminuting the silicon material (e.g., without breaks during comminution). Preferably straight-edged silicon particles or materials (e.g., polyhedral shaped silicon particles) are formed. However, in some cases, it may be favorable to form, induce, and/or otherwise spherify the silicon particles (e.g., to form sacrificial particles, depending on an application, etc.). In these cases, spherification can be favored, for instance, by intermittent comminution (e.g., iteratively comminuting and not comminuting the silicon material for a first and second amount of time respectively until a total time, total comminution time, etc. has elapsed). However, spherificiation can otherwise be favored or avoided (e.g., by including particular comminution agents, based on a comminution temperature, based on a starting characteristic size, starting shape, starting size distribution, etc.).

Fusing the silicon S220 is preferably performed when the surface area of the silicon (e.g., external surface area, total surface area, etc.) is greater than about 10 $m^2/g$ (e.g., 10 $m^2/g$, 20 $m^2/g$, 30 $m^2/g$, 50 $m^2/g$, 70 $m^2/g$, 100 $m^2/g$, 200 $m^2/g$, 300 $m^2/g$, 500 $m^2/g$, 1000 $m^2/g$, values therebetween, >1000 $m^2/g$). However, S200 can be performed when the surface area of the silicon is less than 10 $m^2/g$, when a characteristic size of the silicon is greater than a threshold size (e.g., mean characteristic size; such as greater than about 1 μm, 2 μm, 5 μm, 10 μm, 20 μm, 50 μm, 100 μm, etc.), when a characteristic size of the silicon is less than a threshold size (e.g., mean characteristic size; such as less than about 10 nm, 20 nm, 50 nm, 100 nm, 200 nm, 500 nm, 1 μm, 2 μm, 5 μm, 10 μm, values or ranges therebetween, etc.), based on (e.g., responsive to, depending on, to modify, etc.) a dispersion of the characteristic size distribution (e.g., variance, standard deviation, skew, kurtosis, covariance, other moment(s) of the distribution, etc.), based on a property of the silicon (e.g., silicon purity, amount of oxygen, etc. such as measured during S100, after S100, before S300, etc.), randomly, for each instance of the method, based on the silica reduction (e.g., whether a salt is used, a temperature of the silica reduction, a duration of the silica reduction, etc.), and/or under or in response to any condition(s).

The exterior surface of the silicon after fusing can be semipermeable (e.g., allows reagents or materials from an external environment to enter an internal volume of the silicon; permeability greater than about $10^{-14}$ $m^2$; permeable to one or more species such as particular reagents for instance carbon or its allotropes or molecules derived therefrom, particular ions for instance lithium ions, etc.), which can facilitate washing and/or removal of contaminants, impurities, byproducts, unreacted species (e.g., unreacted silica, reaction modifiers, etc.), and/or other species from within the internal volume, can facilitate lithiation (and/or delithiation) of the silicon material, can facilitate doping of the silicon material (e.g., addition of oxygen to increase a stability), and/or can otherwise be beneficial or provide a technical advantage. However, the resulting exterior surface can be impermeable and/or have any suitable permeability or surface structure.

The surface area of the silicon (e.g., measured surface area, exterior surface area, etc.), after fusing the silicon, is preferably less than about 100 $m^2/g$ (e.g., 1 $m^2/g$, 2 $m^2/g$, 4 $m^2/g$, 10 $m^2/g$, 20 $m^2/g$, 30 $m^2/g$, 50 $m^2/g$, 100 $m^2/g$, values therebetween, <1 $m^2/g$, etc.), but the surface area can be greater than about 100 $m^2/g$.

The crystallinity of the silicon can change during or after comminuting the silicon. For example, the silicon can be changed from a crystalline phase to an amorphous phase; new phases can be formed (such as changing from an external surface oxygen-rich/core silicon-rich phase to a phase with silicon and oxygen atoms homogeneously distributed), and/or otherwise change the silicon phase. In a specific example, a surface of the silicon can become amorphous (e.g., the fused external surface can be amorphous). In another example, fusing the silicon particles can introduce grain boundaries (e.g., introduce new grains, form grains at the fused surface, etc.), where the grain boundaries can be amorphous (as shown for example in FIG. 15A, FIG. 15B, FIG. 15C, FIG. 15D, etc.). In a variation of the second example, the grain boundaries can form larger amorphous regions when particles are fused. For instance, when an unfused particle has a 1-3 nm thick surface that is amorphous after fusing the unfused particle with other unfused particles, an amorphous region can be 2-10 nm thick (e.g., additive from an amorphous region from each particle, including an additional amorphous thickness by inducing greater amorphous regions than were otherwise present, as shown for example in FIGS. 15A-15D, etc.). Greater amounts of amorphous silicon can be beneficial for improving a stability of the silicon material (for example by decreasing an amount of stress or strain that the silicon material undergoes during lithiation). However, the silicon crystallinity can be unchanged by the fusion process and/or the silicon can have any suitable crystallinity.

In some variants, fusing the silicon can include melting the silicon (or a portion thereof). Melting the silicon preferably functions to melt a portion (e.g., a surface, an exterior surface, etc.) of the silicon material. Melting the silicon can additionally or alternatively sinter or anneal a portion of the silicon and/or otherwise function. Melting the silicon is preferably performed after reducing the silicon (e.g., before cooling the silicon from the reducing temperature). The silicon is preferably melted at a melting temperature, but can be melted at any suitable temperature. The melting temperature can be achieved by heating a chamber the silicon is disposed in, using laser heating, using electrical heating (e.g., electric current sintering), microwave sintering, and/or other heating or sintering techniques. The melting temperature can depend on one or more reaction modifier(s) (e.g., a melting temperature of the reaction modifier, an amount of reaction modifier, a type of reaction modifier, a thermal coefficient of the reaction modifier(s), etc.), a characteristic size of the silicon, a characteristic size of the silica starting material, and/or any suitable properties. The melting temperature is preferably a temperature below the silicon melting temperature (approximately 1400° C. for bulk silicon) to promote melting proximal the surface (e.g., exterior surface) of the silicon (e.g., because the melting temperature can be lowered by the size and/or morphology of the silicon). However, the melting temperature can be greater than or equal to the silicon melting temperature. The melting temperature is preferably greater than the reduction temperature, but can be less than or equal to the reduction temperature. The melting temperature is preferably between about 700° C. and 1200° C. (e.g., 700° C., 750° C., 790° C., 800° C., 850° C., 900° C., 950° C., 1000° C., 1050° C., 1100° C., 1150° C., 1200° C., values therebetween), but can be less than 700° C. or greater than 1200° C. In a first illustrative example as shown in FIG. 3A, when the silicon includes salt (e.g., the silica starting material is reduced in the presence of salt), the melting temperature can be approximately 790° C. (e.g., ±1° C., ±5° C., ±10° C., ±20° C., ±50° C., etc.). In a second illustrative example as shown in FIG. 3B, when the silicon does not include salt (e.g., the silica starting material is not reduced in the presence of salt), the melting temperature can be between about 900-1200° C. However, the silicon can be melted (or partially melted) at any suitable temperature.

The ramp rate to the melting temperature (e.g., from room temperature, from the reducing temperature, etc.) is preferably between about 0.01° C./min and 10° C./min (e.g., 0.01° C./min, 0.1° C./min, 0.5° C./min, 1° C./min, 5° C./min, 10° C./min, etc.). However, the ramp rate can be greater than 10° C./min (e.g., 20° C./min, 25° C./min, 30° C./min, 50° C./min, 100° C./min, etc.), be within a range thereof, and/or be less than 0.01° C./min. The ramp rate can be constant or vary. However, any ramp rate can be used.

The silicon can be maintained at the melting temperature for an amount of time between about 10 minutes and 24 hours (e.g., 10 min, 20 min, 30 min, 45 min, 60 min, 2 hr, 4 hr, 6 hr, 12 hr, 18 hr, 24 hr, values therebetween), but can be maintained at the melting temperature for less than 10 min or greater than 24 hours. The amount of time can depend on: the amount of silicon; the presence, identity, amount, etc., of reaction modifiers; the melting temperature; the reduction temperature; a target surface melting thickness; a measured surface melting (e.g., measured in situ during the melting process); and/or any suitable properties.

In variants of comminuting the silicon including milling the silicon S240 material, milling (or grinding) the silicon preferably functions to weld or fuse the exterior surface of the silicon (e.g., without heating the silicon; without intentionally heating the silicon; without heating the silicon above a threshold temperature such as 300° C., 400° C., 500° C., 600° C., etc.; with heating the silicon, etc.). In an illustrative example (as shown for example in FIGS. 5A, 5B, and/or 5C), during the milling process, two or more silicon particles can be deformed and welded repeatedly into a coextensive cluster (e.g., with larger overall particle size than the initial silicon particles). In this illustrative example, the void space (e.g., pores cooperatively defined by the particles) between the silicon particles can be sealed in the newly formed cluster, which can lead to a higher porosity silicon cluster. This contrasts with traditional milling (or other comminuting) processes that aim to (or achieve a) decrease a particle size. However, the milling process can otherwise modify the silicon material (or particles thereof), for example to achieve a decreased size of the silicon material (as one may traditionally expect from a milling process).

The silicon is preferably milled (e.g., comminuted) according to a set of milling properties (e.g., comminution properties). The set of milling properties can include: weight ratio (e.g., of balls to silicon material), milling speed, milling time, mill type, milling container, grinding medium (e.g., type, material, shape, size, size distribution, comminution medium, etc.), volume percentage of material filling in the container, milling temperature (e.g., comminution temperature), milling atmosphere (e.g., comminution atmosphere), milling agents (e.g., one or more chemicals added with the silicon during the milling process such as to enhance the milling process, to modify the resulting silicon, comminution agent, etc.), milling jar temperature, and/or any suitable properties. The milling properties can be selected based on target silicon properties (e.g., characteristic size, characteristic size distribution, shape, etc.), initial silicon properties (e.g., characteristic size, characteristic size distribution, shape, etc.), a target energy provided to the powder (e.g., the silicon and/or milling agents to be milled), a target amount of processing time, and/or otherwise be selected.

The weight ratio (e.g., the ratio between the weight of the balls and the weight of the silicon and/or other comminuted materials) is preferably between 1:1 and 250:1 (such as 5:1, 10:1, 20:1, 50:1, 100:1, 150:1, 200:1, etc.), but can be less than 1:1 or greater than 250:1. In general, higher weight ratios provide higher energy and shorter milling time to reach desired silicon properties. However, the weight ratio can be otherwise related or tuned in response to the target silicon properties.

The milling speed (e.g., comminution speed) is preferably a value or range between about 1-2500 rpm (e.g., 100, 200, 300, 400, 500, 600, 700, 800, 900, 1000, 1200, 1500, 1750, 2000, 2500, values or ranges therebetween, etc.), but less than 1 rpm or greater than 2500 rpm. In general, higher milling speed provides more energy to the powder (e.g., silicon, milling agents, etc.). As a first specific example, a silicon material can be milled (e.g., continuously milled) at about 900 rpm (e.g., 750-1000 rpm). As a second illustrative example, a silicon material can be milled (e.g., continuously milled, intermittently milled) at about 500 rpm (e.g., 350-600 rpm) which can be beneficial for scaling silicon material comminution (e.g., as larger mills can be more likely to be able to achieve slower milling speed). However, the milling speed can be otherwise related or tuned in response to the target silicon properties.

The milling time (e.g., comminution time) is preferably an amount or range of time between 1 min and 1000 hours (such as 1-24 hours), but can be less than 1 min or greater than 1000 hours. The milling time can be a contiguous milling time (e.g., a continuous milling time), a total milling time (e.g., including time spent not milling the material such as to allow the material to cool), a total amount of time that the mill is operable for (e.g., an amount of time that does not include periods of time that the mill is not operating), and/or any suitable time. When the powder is milled intermittently, the milling can be performed with a predetermined frequency, with a predetermined period, with random timing, according to a milling schedule, and/or with any suitable timing.

The silicon material is preferably comminuted continuously (e.g., without interruption); however, the silicon material can be comminuted intermittently (e.g., with interruptions). Whether a silicon material is comminuted with or without interruptions can depend on the silicon material, the comminution speed (e.g., higher speeds such as 900 rpm can favor continuous comminution, lower speeds such as 350 or 500 rpm can favor intermittent comminution, etc.), target comminuted silicon properties (e.g., characteristic size, void spaces, porosity, etc.), comminution temperature, and/or any suitable properties. As an illustrative example of an intermittent comminution, the silicon material can be comminuted for 1-10 minutes and then rested for 1-10 minutes (which can be beneficial for reducing a temperature of the silicon material and/or comminution container such as to prevent a heat build-up within the comminution container), repeated for a total time of 1-5 hours. Intermittent comminution can have a duty cycle between 1% and 99% (e.g., 1% of the time actively comminuting to 99% of the time with active comminution), and/or can have any suitable duty cycle. When the silicon is comminuted intermittently, the silicon is preferably comminuted for a greater amount of time that the silicon material is rested (e.g., not comminuted). For example, a silicon material can alternate between being comminuted for a comminution time (e.g., 10 min, 20 min, 30 min, 45 min, 60 min, 2 hr, 4 hr, 6 hr, 8 hr, 12 hr, 24 hr, values or ranges therebetween, etc.) and resting for a resting time (e.g., 1 min, 2 min, 3 min, 4 min, 5 min, 10 min, 15 min, 20 min, 30 min, 45 min, 60 min, 2 hr, 4 hr, 6 hr, 8 hr, 10 hr, 12 hr, 24 hr, values or ranges therebetween, etc.). Comminution and resting can be alternated a predetermined number of times (e.g., once, twice, thrice, 5×, 10×, etc.), until a target time has elapsed, until a target parameter is achieved (e.g., target temperature, target product release, etc.), until a target silicon material property (e.g., particle size, surface area, etc.), and/or until any suitable criteria is met. In an illustrative example, silicon particles can be comminuted for about 1 hour (e.g., 50-70 minutes), rested for about 3 minutes (e.g., 1-5 minutes). In this illustrative example, the total comminution time can be about 3 hours (e.g., 3 comminution and resting cycles). However, any suitable comminution parameters (e.g., comminution time, resting time, etc.) can be used.

Examples of mill types include: shaker mills, planetary mills, attritors, uni-ball mills, IsaMills, rod mills, stamp mills, arrastras, pebble mills, SAG mills, AG mills, tower mills, Buhrstone mills, VSI mills and/or any suitable mill and/or milling technique can be used.

The comminution container 400 (e.g., milling container) can be made of or include: steel, including hardened steel, tool steel, hardened chromium steel, tempered steel, stainless steel, tungsten carbide cobalt (WC—Co), WC-lined steel, bearing steel, copper, titanium, sintered corundum, yttria-stabilized zirconia (YSZ), sapphire, agate, hard porcelain, silicon nitride (e.g., $Si_3N_4$), and/or any suitable materials. The comminution container can be the same or different from the reducing chamber. The comminution container volume can be between $10^{-6}$ $m^3$ and 1 $m^3$, but can be smaller than $10^{-6}$ $m^3$ or larger than 1 $m^3$.

Figure 8:
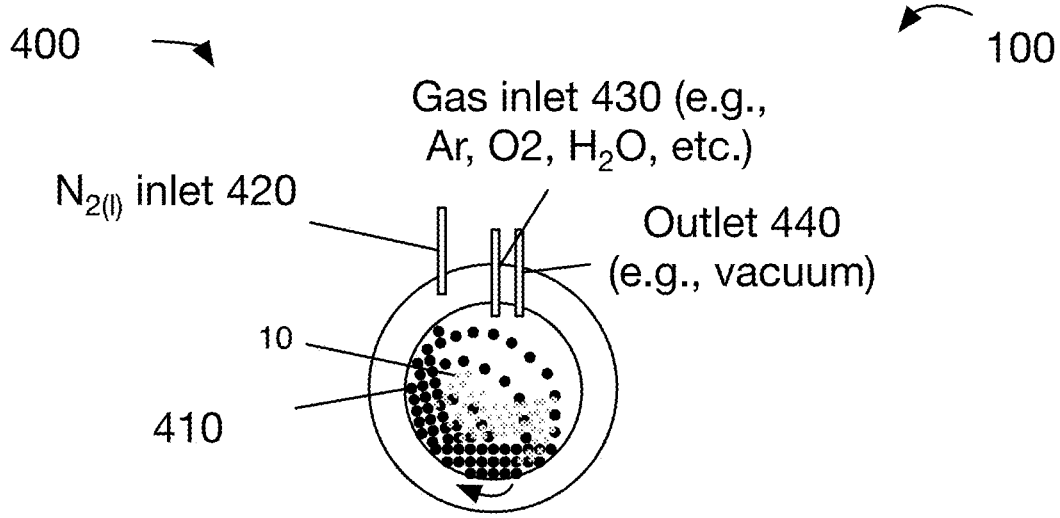
FIG. 8 is a schematic representation of an exemplary milling container.

The comminution container 400 is preferably cooled (e.g., in contact with a cooling system), which can function to enable a longer continuous milling time (e.g., without damaging the milling jar, the silicon material, etc.). The comminution container can be air cooled, water cooled (e.g., optionally including a freezing point depressant such as glycol), cryogenically cooled (e.g., using dry ice, a dry ice and acetone mixture, liquid nitrogen, liquid helium, liquid argon, liquid hydrogen, liquid methane, etc.), and/or can otherwise be cooled. For instance, the comminution container can be cooled to 20° C., 10° C., 0° C., −10° C., −20° C., −50° C., −100° C., −150° C., −200° C., −250° C., −270° C., temperatures or ranges therebetween, and/or to any suitable temperature. However, the comminution container can additionally or alternatively be heated (e.g., to enable finer control over the milling temperature; to achieve a comminution temperature above room temperature such as up to 100° C., a comminution temperature range between about −100 and 100° C., etc.; to enable sintering or melting of material within the mill; to facilitate PI, PD, PID, etc. control over the comminution temperature; etc.), and/or otherwise have any suitable temperature control (or lack thereof). As a specific example, a cryogenic milling container can be used (e.g., a milling container cooled using liquid nitrogen such as introduced through a cryogen inlet 420, as shown for instance in FIG. 8, etc.).

The volume of the comminution container is preferably filled (e.g., with grinding medium, with powder, with additives, etc.) to a value or range between about 1-99% (e.g., 50%) of the total volume of the milling container, but the milling container can be less than 1% or greater than 99% filled.

The milling medium 410 (e.g., comminution medium, milling medium, grinding medium, etc.) can be made of or include: hardened steel, tool steel, hardened chromium steel, tempered steel, stainless steel, tungsten (W), tungsten carbide (WC), tungsten carbide-cobalt (WC—Co), WC-lined steel, bearing steel, copper (Cu), titanium (Ti), sintered corundum, yttria-stabilized zirconia (YSZ), sapphire, agate, hard porcelain, silicon nitride ($Si_3N_4$), and/or any suitable material(s). Tungsten based comminution medium (e.g., milling medium) can be beneficial for avoiding or limiting an amount of introduced impurities and/or contaminants. However, any milling media can be suitable and/or beneficial (e.g., for having a lower cost). The size (e.g., radius, diameter, circumference, characteristic size, largest dimension, smallest dimension, etc.) of the grinding medium (e.g., grinding balls) is preferably a value or range between 100 nm and 10 cm (e.g., 100 nm, 300 nm, 500 nm, 1 μm, 3 μm, 5 μm, 10 μm, 30 μm, 50 μm, 100 μm, 300 μm, 500 μm, 1 mm, 3 mm, 5 mm, 10 mm, 30 mm, 50 mm, 100 mm, values or ranges therebetween, etc.), but can less than 100 nm or greater than 10 cm. The size distribution of the grinding medium can be a Dirac delta distribution, a normal distribution, a skewed distribution, an asymmetric distribution, a symmetric distribution, and/or have any suitable size distribution. The grinding medium is preferably ball shaped (e.g., spherical, spheroidal, etc.), but can be elliptical, ovate, polyhedral, and/or have any suitable shape. In an illustrative example, a zirconia jar can be used for the milling container and zirconia can be used as the milling media. In this illustrative example, zirconia can be used because it has a higher hardness than the silicon. However, any suitable material (e.g., with a higher or lower hardness than silicon) can be used.

The comminution temperature (e.g., milling temperature) is preferably between about −200° C. to 200° C., but the milling temperature can be less than −200° C. or greater than 200° C. In general, higher temperature promotes or increase a diffusion rate (e.g., of the silicon material), which can increase a welding effect (e.g., fusion such as increasing a thickness of the exterior surface) and/or lead to larger particle sizes. However, the milling temperature can otherwise be related to the final silicon material morphology. In specific examples, the milling temperature can be controlled by a cooling/heating system, such as water cooling or electrical heating. However, the milling temperature can otherwise be controlled.

The comminution atmosphere (e.g., milling atmosphere) can be an inert atmosphere (e.g., includes helium, nitrogen, neon, krypton, argon, xenon, radon, cardon dioxide, or other gases that do not react with or have a low reaction with silicon and/or other materials), which can function to inhibit (or prevent) nitride, oxide, hydride, oxynitride, and/or other species formation, can include one or more reactive species (e.g., reactive nitrogen species, reactive oxygen species, oxygen, ozone, halogens, hydrogen, carbon monoxide, methane, ethane, ethene, ethyne, carbon sources, etc.), vacuum, and/or any suitable species. The reactive species can be used, for example, to induce or form one or more of a nitride, oxide, hydride, oxynitride, and/or other species on or within the silicon material, to coat the silicon material (e.g., with a carbon coating such as a graphitic coating, amorphous carbon, to introduce carbon doping in the silicon material, etc.), and/or can otherwise be used. In variants where a reactive species is introduced (e.g., via a reactive agent inlet 420), the amount of reducing agent introduced can depend on: a silicon purity, a target silicon material composition (e.g., target mass composition of the material), a surface area of the silicon material, a duration of comminution, a silicon particle size, a comminution container size, and/or based on any suitable comminution parameter and/or silicon material property. The reactive agents can be added at the start of comminution, after comminution is complete, after a threshold comminution time (e.g., after 1 min, 2 min, 5 min, 10 min, 20 min, 30 min, 60 min, 120 min, 4 hrs, 6 hrs, 8 hrs, 12 hrs, 24 hrs, etc. of comminution in a substantially inert atmosphere), and/or at any suitable time.

A pressure of the comminution atmosphere (e.g., milling atmosphere) is preferably less than standard pressure (e.g., less than about 760 Torr such as controlled using an exhaust 440, vacuum pump connected to an outlet, etc.) which can be beneficial for decreasing and/or accounting for pressure that is generated or built-up during milling. For instance, the milling pressure can be less than 10 Torr, 10 Torr, 100 Torr, 200 Torr, 500 Torr, 700 Torr, 720 Torr, 750 Torr, values therebetween, and/or any suitable pressure.

In a first specific example, the comminution atmosphere can include an inert gas flowed into the comminution container at a flow rate between about 1 sccm (standard square cubic centimeter per minute) and 10,000 sccm (e.g., 1 sccm, 2 sccm, 5 sccm, 10 sccm, 20 sccm, 50 sccm, 100 sccm, 200 sccm, 500 sccm, 1000 sccm, 2000 sccm, 5000 sccm, values or ranges therebetween, etc.). In a variation of the first specific example, the comminution atmosphere can include a reactive agent (e.g., oxygen, hydrogen, etc. such as high purity reactive agent with approximately 90%, 95<%, 98%, 99%, 99.5%, 99.9%, 99.95%, 99.99%, 99.995%, 99.999%, etc. purity) flowed into the comminution container at a flow rate that is between about 1 sccm and 10,000 sccm (e.g., 1 sccm, 2 sccm, 5 sccm, 10 sccm, 20 sccm, 50 sccm, 100 sccm, 200 sccm, 500 sccm, 1000 sccm, 2000 sccm, 5000 sccm, values or ranges therebetween, etc.). In a second variation of the first specific example, the comminution atmosphere can include air and/or artificial air (e.g., a gas with a composition approximating air, roughly 80% $N_2$ and 20% $O_2$ and trace other elements, etc.) flowed into the comminution container at a flow rate that is between about 1 sccm and 10000 sccm. In a second specific example, the comminution atmosphere can include air and/or artificial air (e.g., a gas with a composition approximating air, roughly 80% $N_2$ and 20% $O_2$ and trace other elements, etc.). However, any suitable composition of atmosphere can be used.

The milling agents (e.g., comminution agents) can function to: modify a property of the silicon material, form a layer on the silicon material (e.g., to form an SEI layer on the silicon material), modify a layer property (e.g., a layer elasticity), form a composite with the silicon material, modify the milling process, modify the silicon fusion (e.g., inhibit and/or promote the fusion of silicon material, inhibit or promote the formation of the composite and/or layer, etc.), inhibit or promote oxidation (or other reactions) with the silicon material, function as a lubricant, change a silicon crystallinity, and/or can otherwise function. The milling agents can be gaseous, liquid, solid, and/or any suitable phase. The weight ratio of the milling agents to the silicon material is preferably a value or range between 1% and 99% (e.g., 1%, 2%, 10%, 20%, 25%, 50%, 75%, 80%, 90%, 99%, etc.), but the weight ratio can be less than 1% or greater than 99%.

Exemplary milling agents include: lithium compounds (e.g., lithium hydroxide, lithium halides, lithium pseudohalides, lithium carbonate, lithium oxide, lithium silicate, lithium hydride, etc.), graphite, nanocarbon (e.g., graphene, nanotubes, etc.), polymers (e.g., electrically conductive polymers, ionically conductive polymers, flexible polymers, rubbers, etc. such as PAN, PPy, PVDF, PVP, polyimide, PEDOT:PSS, alginate, PEO, IIR, SBR, NBR, EPM, EPDM, ECO, ACM, ABR, SI, Q, VMQ, FVMQ, etc.), oxalic acid, boric acid, borax, alumina, aluminum nitrate, stearic acid, hexane, heptane, octane, dodecane, methanol, ethanol, benzene, toluene, tetrahydrofuran, C wax, silicon grease, paraffin, polyethylene glycol, salt (e.g., sodium chloride), ethyl acetate, didodecyl dimethyl ammonium acetate (DDAA), dihexadecyl dimethyl ammonium acetate (DHDAA), ethylenebisdistearamide Nopcowax-22 DSP, lithium-1,2-bis-dodecyloxy carbonyl sulfasuccinate, sodium-1,2-bis(dodecyl carbonyl)ethane-1-sulfonate, solvents (e.g., washing solvents), and/or any suitable milling agent(s). In some variants, milling agents can be or include any suitable process control agents for grinding processes. The inclusion of polymer and/or carbon (e.g., graphite, nanotubes, graphene, carbon super black, organic materials, etc.) during the comminution process can additionally or alternatively be beneficial for decreasing (e.g., preventing) spherification during the comminution (e.g., by lubricating the silicon, grinding materials, grinding agents, etc.)

In some variants, comminuting the silicon material can additionally or alternatively function to activate and/or cyclize a polymer (e.g., a polymer coating the silicon material), change (e.g., improve, impair) an adhesion of the polymer (or other coating) to the silicon material, coat a silicon material, change a composition of a silicon material (e.g., increase a carbon content, decrease a carbon content, increase a dopant concentration, decrease a dopant concentration, etc.), and/or otherwise function. For example, when a temperature (e.g., milling chamber temperature, local temperature of the silicon material and/or polymer, etc.) is at least a threshold temperature (e.g., 100° C., 150° C., 200° C., 250° C., 300° C., 500° C., etc.), the polymer can be cyclized by the milling process (e.g., without using a separate cyclization or activation process). In related examples, the temperature can facilitate the mixing and/or coating of the silicon material with the polymer. However, when the milling process does not generate enough heat to activate or cyclize the polymer, the mill (and/or components thereof) can be heated (e.g., to approximately the melting temperature or activation temperature of the polymer such as within ±5° C., ±10° C., ±20° C., etc.), the silicon mixture can be heated (e.g., after milling to approximately the melting temperature of the polymer), and/or the polymer can otherwise be activated.

However, the silicon material and/or polymer can other function or respond to the temperature and/or milling.

Comminuting the silicon material can include collecting the silicon material. For example, the material can be scraped off a wall of the comminution chamber, powdered (e.g., by crushing, grinding, milling such as at a low speed between about 10-500 rpm, cutting, using a mortar and pestle, etc.), passed through a filter (e.g., sieve, mesh, etc.), and/or can otherwise be collected.

Washing the silicon S300 functions to clean (e.g., remove residual reaction modifiers such as salts, reducing agents, etc.; remove residual silica; remove one or more impurities; etc.) the manufactured silicon (e.g., manufactured in S100, comminuted in S200, coated or otherwise processed in S400, etc.). S300 is preferably performed after S100, but can be performed during or after S100. S300 can be performed before, during, or after S200 (e.g., to wash an internal volume and/or interior space of the silicon material). S300 can be performed in the same or a different chamber from the reducing chamber (e.g., used for S100) and/or the comminution or fusion chamber (e.g., used for S200).

The silicon is preferably washed at a washing temperature. However, the silicon can be washed at any suitable temperature. The washing temperature is preferably less than room temperature (e.g., less than 20° C., less than 25° C., less than 30° C., etc. such as −200° C., −196° C., −150° C., −100° C., −50° C., −20° C., −10° C., 0° C., 5° C., 10° C., 13° C., 15° C., values or ranges therebetween, etc.), which can be particularly but not exclusively beneficial for washing steps that are exothermic. However, the washing temperature can be greater than room temperature. The washing temperature can be maintained using a cooling bath (e.g., water bath, ice bath, saltwater bath, acetone/dry ice bath, dry ice bath, liquid nitrogen, pure or mixed solvent baths, etc.), using chamber cooling (e.g., forced cooling, Peltier cooling, refrigeration, air cooling, cryogenic chamber, etc.), and/or otherwise be maintained or generated.

Washing the silicon preferably includes washing the silicon using one or more solvents. The solvents can be pure solvents (e.g., single component) or solvent mixtures. Examples of washing solvents can include: organic solvents (e.g., alcohols such as methanol, ethanol, isopropyl alcohol, propanol, butanol, pentanol, diols, triols, etc.; aldehydes; ketones such as acetone; oils; hydrocarbons such as pentane, hexane, etc.; aromatic compounds such as benzene, toluene, etc.; ethers such as dioxane, diethyl ether, tetrahydrofuran, etc.; esters such as ethyl acetate; amides such as dimethylformamide; sulfoxides such as dimethyl sulfoxide; nitriles such as acetonitrile; nitro compounds such as nitromethane; etc.), water, inorganic solvents (e.g., liquid ammonia, carbon dioxide such as supercritical carbon dioxide, phosphorous tribromide, carbon disulfide, carbon tetrachloride, etc.), and/or any suitable solvents. In a specific example, a washing solvent can include a mixture of water and ethanol (e.g., 10/90, 20/80, 30/70, 40/60, 50/50, 60/40, 30/70, 80/20, 90/10 or other ratios such as ratios therebetween where the ratio can be a mass ratio, volume ratio, stoichiometric ratio, etc.). In a second specific example, a washing solvent can include a mixture of water and isopropyl alcohol (e.g., 10/90, 20/80, 30/70, 40/60, 50/50, 60/40, 30/70, 80/20, 90/10 or other ratios such as ratios therebetween where the ratio can be a mass ratio, volume ratio, stoichiometric ratio, etc.). In a third specific example, a washing solvent can include a mixture of ethanol and isopropyl alcohol (e.g., 10/90, 20/80, 30/70, 40/60, 50/50, 60/40, 30/70, 80/20, 90/10 or other ratios such as ratios therebetween where the ratio can be a mass ratio, volume ratio, stoichiometric ratio, etc.).

In some variations, one or more of the washing solvents can be added as a solid. These variations can be beneficial for maintaining a temperature of the silicon during the wash (e.g., because of the heat used to melt the solvent), for controlling a rate of change of the temperature of the silicon during the wash, controlling a washing reaction rate, and/or otherwise be beneficial. For instance, ice can be used to add water to the washing solution. However, the solvents can be added as a liquid, gas, plasma, mixture, and/or in any suitable phase.

Washing the silicon can include washing the silicon using one or more washing agent. The washing agent can be dissolved in, suspended in, and/or otherwise be mixed in or separate from the washing solvent. The washing agent can include acid(s) (e.g., hydrochloric acid, hydrobromic acid, hydrofluoric acid, sulfuric acid, nitric acid, etc.), base(s) (e.g., sodium hydroxide, potassium hydroxide, etc.), surfactants, and/or any suitable washing agents. The washing agent can be concentrated (e.g., at a highest concentration that can be achieved in a given washing solvent, to <0.1 molar (M), 0.5 M, 1M, 2 M, 3 M, 4M, 5M, 6 M, 10 M, 12 M, 18 M, 24 M, etc.), pure, and/or have any suitable concentration.

The washing solution (e.g., solvent and/or any washing agents) are preferably added slowly (e.g., dropwise, at less than a threshold rate, etc.), but can be added rapidly (e.g., all at once, at greater than a threshold rate, etc.) and/or at any rate. The washing solution and silicon are preferably continuously agitated (e.g., stirred, mixed, etc.) which can function to hinder or prevent hot spots (e.g., ensure an approximately homogeneous temperature of the washing solution and/or silicon). However, the washing solution and the silicon can be intermittently agitated, not be agitated, and/or be agitated in any manner.

The washed silicon can be fused (e.g., according the S200, according to other fusion processes). Similar washing steps can be performed on a silica or other starting material (e.g., prior to S100, S200, S400, etc.; subsequent to S100, S200, S400, etc.).

The method can optionally include processing the silicon material S400, which can function to functionalize and/or otherwise modify a property of the silicon material. Processing the silicon material can be performed concurrently or contemporaneously with (e.g., the same process can fuse or comminute the silicon and coat the silicon), before, and/or after S200 or S300. Processing the silicon material can include coating the silicon material S450 (e.g., coating the material with carbon such as graphite, nanotubes, graphene, fullerenes, amorphous carbon, carbon super black, polymers including polyacrylonitrile (PAN), polyethylene oxide (PEO), etc.; coating the material with a material and/or in a manner as disclosed in U.S. patent application Ser. No. 17/667,366 titled 'SILICON MATERIAL AND METHOD OF MANUFACTURE' filed 8 Feb. 2022 which is incorporated in its entirety by this reference; etc.), reducing particle agglomeration (e.g., via a comminution process, via grinding, via crushing, via milling, etc.), and/or any suitable processing steps. For example, the silicon material can be coated with a solid electrolyte interface (SEI) layer (e.g., forming a layer with a high lithium content). In a second example, the silicon material can be coated with a carbon coating. However, the silicon material can be coated with any suitable material.

In a specific example, the silicon material can be coated using a gas phase deposition process. The gas phase deposition is preferably performed at a temperature between about 700-850° C. to hinder and/or prevent deformation of the silicon material, but can be performed at higher temperatures (e.g., 850-1200° C.) which can lead to better carbon coating (e.g., more uniformity, thicker carbon layer, etc.) or at a lower temperature (e.g., <700° C.). The silicon material can be coated using ethyne, ethene, propene, propyne, and/or any suitable carbon source. The silicon material is preferably coating in a coating chamber with blades and/or a high flow rate that can agitate the silicon material to promote carbon coating, but can be coated in any suitable coating chamber. Variations of this specific example can be used for silane ($SiH_4$) deposition and in situ carbon coating in a batch process.

In a second specific example, the silicon material can be coated with a polymer by dissolving the polymer in solvent, mixing the silicon material with the dissolved polymer, and drying the mixture. This (dried) mixture can then be milled (e.g., according to S200), heated to an activation temperature (e.g., a cyclization temperature of the polymer such as approximately 300° C. for PAN polymer), and/or otherwise be used or processed. In a variant of this specific example, the mixture can be cast as a film (e.g., in an electrode, without drying first) and heated to an activation temperature (e.g., approximately 300° C. such as 260-320° C.). However, the silicon material can otherwise be coated.

5. Illustrative Examples

In a first illustrative example, as shown in FIG. 3A, a method for manufacturing a silicon material can include: mixing a silica precursor with a salt and a reducing agent, heating the silica precursor mixture to a reduction temperature to reduce the silica precursor to silicon, heating the silicon to a melting temperature of about 800° C. (e.g., a temperature between 770-810° C.), washing the melted silicon with an acid (e.g., HCl) at a temperature below about 30° C., milling the washed silicon to fuse silicon particles, milling the fused silicon with graphite to form a silicon/carbon composite, and milling the silicon/carbon composite with a polymer.

In a second illustrative example, as shown in FIG. 3B, a method for manufacturing a silicon material can include: mixing a silica precursor with a reducing agent, heating the silica precursor mixture to a reduction temperature to reduce the silica precursor to silicon, heating the silicon to a melting temperature of between about 900 and 1200° C., washing the melted silicon with an acid (e.g., HCl) at a temperature below about 30° C., milling the washed silicon to fuse silicon particles, milling the fused silicon with graphite to form a silicon/carbon composite, and milling the silicon/carbon composite with a polymer.

In a third illustrative example as shown for instance in FIG. 11, a method for manufacturing a silicon material can include: reducing a silica precursor to silicon; optionally, washing the silicon; and milling the silicon.

In a fourth illustrative example, a method for manufacturing a silicon material can include: reducing a silica precursor to silicon; heating the silicon to a fusion temperature; and, optionally, washing the fused silicon. This illustrative example can be particularly, but not solely, beneficial for silicon material that includes spheroidal particles. The melting process can reduce an external surface area of the silicon material while maintaining a high internal porosity or surface area (e.g., to form a silicon material with a small external surface area and a large internal surface area) and maintaining a spheroidal particle shape after melting. In variations of the fourth illustrative example, the fused silicon can optionally be milled after washing. The fused silicon is preferably milled with lubricating milling agents (e.g., graphite or polymer) and/or under gentle conditions (e.g., low speed such as less than about 80% of the critical speed of the ball mill), but can be milled with any suitable conditions. However, materials formed according to the fourth illustrative example can be used without milling (e.g., because milling can break the particles and/or change the particle shape or size).

In a fifth illustrative example, a method for manufacturing a silicon material can include: reducing a silica precursor to silicon; optionally, fusing a portion of the silicon; optionally, washing the silicon; and fusing a second portion of the silicon.

In a sixth illustrative example as shown for instance in FIG. 12, a method for manufacturing a silicon material can include: comminuting a plurality of silicon particles (e.g., by continuously ball milling the silicon particles at a rate between about 500-1500 rpm, about 900 rpm, etc. for between 1-24 hours), collecting the comminuted silicon particles, crushing the collected silicon particles (e.g., using a mortar and pestle, using a ball mill at a low rate such as 100-500 rpm, etc.), and optionally fusing the crushed silicon particles (e.g., by continuously ball milling the silicon particles at a rate between about 500-1500 rpm for between 1-24 hours), and optionally introducing oxidizing agent (e.g., oxygen) contemporaneously with comminuting and/or fusing the silicon particles. In this specific example, the initial silicon particles can have a characteristic size (e.g., mean characteristic size) between about 1-100 μm and the comminuted silicon particles can have a characteristic size between about 10-500 nm. In variations including fusing the silicon particles, the fused silicon particles can have a characteristic size between about 1-10 μm. The silicon particles preferably have a final composition that includes between about 1-10% oxygen (e.g., by mass). The silicon particles can have a final composition that additionally or alternatively includes about 1-10% carbon (e.g., graphitic carbon, as a silicon carbon alloy, as a silicon carbon composite, as silicon carbide, etc.). However, the silicon material can have a high silicon purity (e.g., 90%, 95%, 98%, 99%, 99.5%, 99.9%, 99.95%, 99.99%, 99.995%, 99.999%, etc.) and/or any suitable composition.

Figure 14A:
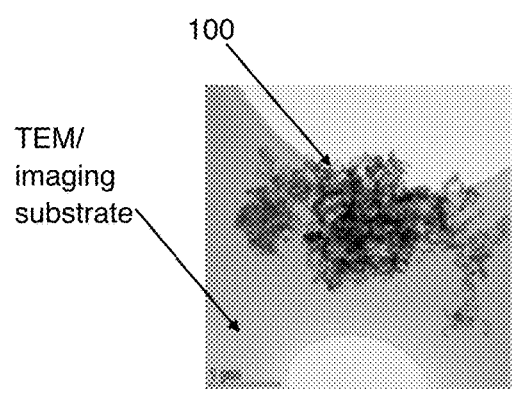
FIGS. 14A and 14C are transmission electron microscope images of exemplary silicon particles before milling.
Figure 14B:
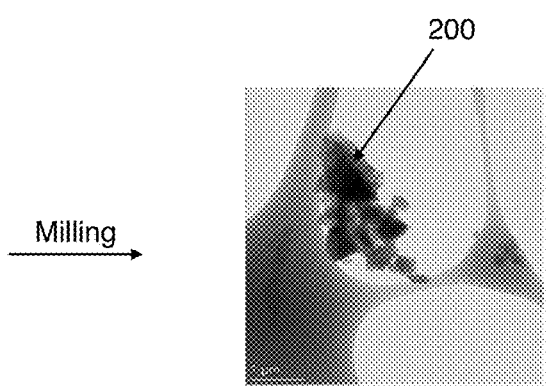
FIGS. 14B and 14D are transmission electron microscope images of exemplary silicon particles analogous to those in FIG. 14A and FIG. 14C respectively, after milling.

In a seventh illustrative example (as shown for instance in FIGS. 14A and 14B), a plurality of (solid) silicon (micro) particles (e.g., with a characteristic size 1-50 μm, 20-50 μm, 10-90 μm, 30-50 μm, 1-10 μm, 2-20 μm, etc.) can be comminuted into primary silicon nanoparticles (e.g., with a characteristic size between about 50-200 nm, 10-100 nm, 20-200 nm, 10-500 nm, 50-250 nm, 50-500 nm, etc.). The primary silicon nanoparticles can be cold-welded (e.g., via comminution, milling, etc.) into fused silicon particles (e.g., defining a void space of 1-10%, 2-20%, 1-50%, etc. between primary particles fused together; with a density 0.5-1.5 g/cm$^3$, 0.1-1 g/cm$^3$, 0.2-2 g/cm$^3$, etc.; with a characteristic size between 500 nm-1 μm, 0.1-10 μm, 1-5 μm, 1-3 μm, 3-5 μm, 5-10 μm, 3-10 μm, etc.; etc.). The plurality of silicon particles can have a surface area that is about 1 m$^2$/g (e.g., 0.5-2 m$^2$/g). The plurality of fused silicon particles can have a surface area between about 1-20 m$^2$/g (e.g., 1, 2, 3, 5, 7, 10, 12, 15, 18, 20, etc.).

Figure 14C:
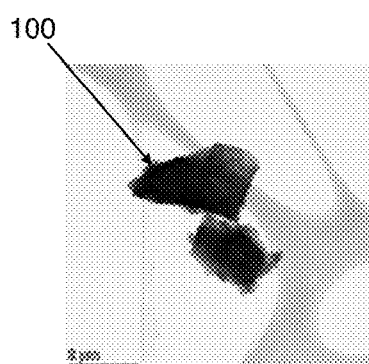
Figure 14D:
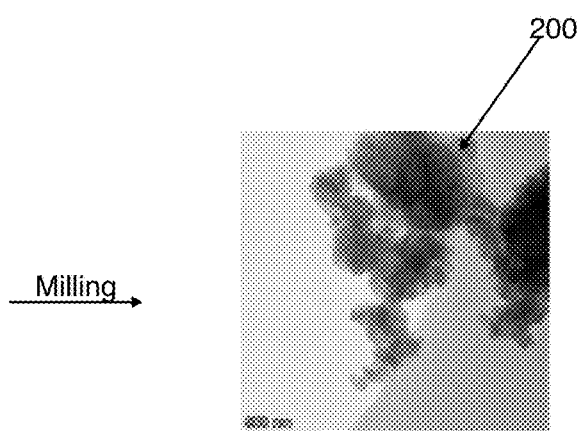

In an eighth illustrative example (as shown for instance in FIGS. 14C and 14D), a plurality of (porous) silicon (nano) particles (e.g., with a characteristic size 1-100 nm, 2-100 nm, 5-200 nm, 10-50 nm, 100-500 nm, 50-500 nm, 10-500 nm, 20-200 nm, etc.) can be fused or cold-welded (e.g., via milling) into a fused silicon particle (e.g., defining a void space of 1-10%, 2-20%, 1-50%, etc. between primary particles fused together; with a density 0.5-1.5 g/cm$^3$, 0.1-1 g/cm$^3$, 0.2-2 g/cm$^3$, etc.; with a characteristic size between 500 nm-1 µm, 0.1-10 µm, 1-5 µm, 1-3 µm, 3-5 µm, 5-10 µm, 3-10 µm, etc.; etc.). The plurality of silicon particles can have a surface area that is greater than about 100 m$^2$/g (e.g., >95 m$^2$/g, 100 m$^2$/g, 110 m$^2$/g, 125 m$^2$/g, 150 m$^2$/g, 200 m$^2$/g, 250 m$^2$/g, 500 m$^2$/g, etc.). The (plurality of) fused silicon particles can have a surface area between about 1-20 m$^2$/g (e.g., 1, 2, 3, 5, 7, 10, 12, 15, 18, 20, etc.).

However, a method for manufacturing a silicon material can include any suitable steps.

The methods of the preferred embodiment and variations thereof can be embodied and/or implemented at least in part as a machine configured to receive a computer-readable medium storing computer-readable instructions. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A silicon material comprising
a silicon aggregate comprising a plurality of porous silicon nanoparticles welded together, wherein the silicon aggregate comprises a substantially polyhedral morphology, wherein a characteristic size of the silicon aggregate is between about 1-10 µm, wherein the silicon aggregate comprises 1-10% by mass carbon, 1-5% by mass oxygen, and at least 50% by mass silicon.

2. The silicon material of claim 1, wherein the oxygen is inhomogeneously distributed in the silicon aggregate.

3. The silicon material of claim 1, wherein the silicon aggregate comprises graphitic and non-graphitic carbon, wherein the non- graphitic carbon is at most 10% of the carbon content by mass.

4. The silicon material of claim 1, further comprising a carbonaceous coating disposed on the silicon aggregate.

5. The silicon material of claim 4, wherein a silicon nanoparticle of the plurality of porous silicon nanoparticles comprises a surface area greater than about 200 m$^2$/g, wherein the silicon aggregate comprises a surface area that is between about 10 and 20 m$^2$/g, and the silicon aggregate coated with the carbonaceous coating comprises a surface area between about 5 and 10 m$^2$/g.

6. The silicon material of claim 1, wherein the porous silicon nanoparticles are manufactured from fumed silica.

7. The silicon material of claim 1, wherein the porous silicon nanoparticles comprise a characteristic size between about 2 and 100 nm.

8. A method for manufacturing a silicon material comprising:
receiving a plurality of porous silicon nanoparticles with a characteristic size between about 2 and 100 nm;
cold welding the plurality of porous silicon nanoparticles into an aggregated silicon particle, wherein the aggregated silicon particle comprises a characteristic size between about 1 µm and 10 µm; and
contemporaneously with cold welding the plurality of porous silicon nanoparticles, carbon coating the plurality of porous silicon nanoparticles by milling the plurality of porous silicon nanoparticles and a polymer.

9. The method of claim 8, wherein cold welding the plurality of porous silicon nanoparticles comprises ball milling the plurality of porous silicon nanoparticles for between 10 minutes and 6 hours at a milling speed between 500 and 1500 rpm.

10. The method of claim 9, wherein the plurality of porous silicon nanoparticles are ball milled in a cryogenic ball mill wherein walls of the cryogenic ball mill are cooled using liquid nitrogen.

11. The method of claim 9, wherein a milling container comprises a zirconia jar and wherein a milling media comprises zirconia balls with a size between 1 mm and 10 mm, and wherein a weight ratio between the zirconia balls and the plurality of porous silicon nanoparticles is about 1:1.

12. The method of claim 9, further comprising introducing oxygen at a flow rate between about 1 sscm and 1000 sscm concurrently with ball milling the plurality of porous silicon nanoparticles.

13. The method of claim 9, wherein the plurality of porous silicon nanoparticles are continuously ball milled.

14. The method of claim 8, wherein the polymer comprises polyacrylonitrile, wherein the method further comprises cyclizing the polyacrylonitrile by heating the polyacrylonitrile to an activation temperature.

15. The method of claim 8, wherein carbon coating the plurality of porous silicon nanoparticles comprises:
dissolving the polymer in a solvent;
mixing the dissolved polymer with the plurality of porous silicon nanoparticles;
removing the solvent to prepare a dry mixture of the polymer and the plurality of porous silicon nanoparticles; and
milling the dry mixture.

16. The method of claim 8, wherein the plurality of porous silicon nanoparticles are manufactured by reducing a fumed silica precursor in the presence of a metal reducing agent at a temperature between about 700° C. and 1000° C.

17. A method for manufacturing a silicon material comprising:
receiving a plurality of porous silicon nanoparticles with a characteristic size between about 2 and 100 nm, wherein the plurality of porous silicon nanoparticles are manufactured by reducing a fumed silica precursor in the presence of a metal reducing agent at a temperature between about 700° C. and 1000° C.; and
cold welding the plurality of porous silicon nanoparticles into an aggregated silicon particle, wherein the aggregated silicon particle comprises a characteristic size between about 1 µm and 10 µm.

18. The method of claim 17, wherein cold welding the plurality of porous silicon nanoparticles comprises ball milling the plurality of porous silicon nanoparticles for between 10 minutes and 6 hours at a milling speed between 500 and 1500 rpm.

19. The method of claim 18, wherein the plurality of porous silicon nanoparticles are ball milled in a cryogenic ball mill wherein walls of the cryogenic ball mill are cooled using liquid nitrogen.

20. The method of claim 18, wherein a milling container comprises a zirconia jar and wherein a milling media comprises zirconia balls with a size between 1 mm and 10 mm, and wherein a weight ratio between the zirconia balls and the plurality of porous silicon nanoparticles is about 1:1.

21. The method of claim 18, further comprising introducing oxygen at a flow rate between about 1 sscm and 1000 sscm concurrently with ball milling the plurality of porous silicon nanoparticles.

22. The method of claim 9, wherein the plurality of porous silicon nanoparticles are continuously ball milled.

* * * * *